United States Patent
Tomita et al.

(10) Patent No.: US 7,685,517 B2
(45) Date of Patent: Mar. 23, 2010

(54) IMAGE EDITING OF DOCUMENTS WITH IMAGE AND NON-IMAGE PAGES

(75) Inventors: Makoto Tomita, Kawasaki (JP); Koji Nakagiri, Kawasaki (JP); Yasuo Mori, Yokohama (JP); Junko Sato, Kawasaki (JP); Wataru Kanaya, Chofu (JP); Michiko Kanaya, legal representative, Chofu (JP)

(73) Assignee: Canon Kabushiki Kaisha, Tokyo (JP)

( * ) Notice: Subject to any disclaimer, the term of this patent is extended or adjusted under 35 U.S.C. 154(b) by 949 days.

(21) Appl. No.: 11/105,483

(22) Filed: Apr. 14, 2005

(65) Prior Publication Data

US 2005/0289460 A1    Dec. 29, 2005

(30) Foreign Application Priority Data

Apr. 16, 2004   (JP)   ............... 2004-121870

(51) Int. Cl.
*G06F 17/00*   (2006.01)
(52) U.S. Cl. ............... 715/276; 715/209; 715/255
(58) Field of Classification Search ........... 715/209, 715/255, 276
See application file for complete search history.

(56) References Cited

U.S. PATENT DOCUMENTS

| | | | | |
|---|---|---|---|---|
| 5,594,815 | A * | 1/1997 | Fast et al. | 382/254 |
| 5,860,074 | A * | 1/1999 | Rowe et al. | 715/235 |
| 6,026,416 | A * | 2/2000 | Kanerva et al. | 715/208 |
| 6,674,540 | B1 * | 1/2004 | Wiechers et al. | 358/1.15 |
| 7,084,992 | B1 * | 8/2006 | Amarger et al. | 358/1.13 |
| 7,203,898 | B2 | 4/2007 | Miyazato et al. | |
| 2003/0056179 | A1 * | 3/2003 | Mori | 715/530 |
| 2003/0158850 | A1 * | 8/2003 | Lawrence et al. | 707/100 |
| 2005/0243371 | A1 | 11/2005 | Kanaya et al. | |

FOREIGN PATENT DOCUMENTS

| | | |
|---|---|---|
| CN | 1372208 | 10/2002 |
| JP | 4-51359 | 2/1992 |
| JP | 11-187231 | 7/1999 |

(Continued)

OTHER PUBLICATIONS

Bott, Ed and Ron Person, Special Edition Using Windows 95 with Internet Explorer 4.0, Feb. 17, 1998, Que, Found at Safari Books Online, http://proquest.safaribooksonline.com/0789715538/ch12lev1sec5#ch12lev1sec5; "Managing Files and Folders".*

*Primary Examiner*—Adam M Queler
(74) *Attorney, Agent, or Firm*—Fitzpatrick, Cella, Harper & Scinto

(57) ABSTRACT

According to this invention, bookbinding data containing pages created by respective applications can be constructed regardless of the type of application. Even when one or more desired pages contained in bookbinding data are selected, image editing is designated, but a non-image page exists in the selected pages, the non-image page can be excluded from editing targets, and the process can shift to image editing. For this purpose, when a plurality of pages are selected and image editing is designated, whether each selected page is an editable image page is determined. An editable page is temporarily stored. After all the selected pages are determined, an image editing application is activated to edit stored editable image pages.

12 Claims, 24 Drawing Sheets

FOREIGN PATENT DOCUMENTS

| | | |
|---|---|---|
| JP | 2001-142880 | 5/2001 |
| JP | 2002-158852 | 5/2002 |
| JP | 2002-229976 | 8/2002 |
| JP | 2003-91518 | 3/2003 |
| JP | 2003-091526 | 3/2003 |
| JP | 2003-330929 | 11/2003 |
| JP | 2004-088201 | 3/2004 |

* cited by examiner

FIG. 4A

| NO | ATTRIBUTE INFORMATION | | REMARKS |
|---|---|---|---|
| 1 | PRINTING METHOD | SINGLE-SIDED/ DOUBLE-SIDED/ BOOKBINDING PRINTING | |
| 2 | PAPER SIZE | DOCUMENT SIZE/ FIXED SIZE | • Z-FOLD IS DESIGNATED WHEN "A4+A3", "B4+B3", OR "LETTER+LEDGER (11x17)" IS DESIGNATED.<br>• DOCUMENT SIZE OF FIRST CHAPTER/PAGE IS AUTOMATICALLY SELECTED WHEN BOOKBINDING PRINTING OR N-up PRINTING IS DESIGNATED. |
| 3 | PAPER ORIENTATION | PORTRAIT/LANDSCAPE | • SELECTABLE ONLY FOR FIXED SIZE |
| 4 | BINDING MARGIN / BINDING DIRECTION | | • SHIFT/ENLARGEMENT & REDUCTION CAN BE DESIGNATED. |
| 5 | N-up PRINTING | NUMBER OF PAGES/LAYOUT ORDER/BORDER LINE/LAYOUT POSITION, ETC. | • LAYOUT POSITION: NINE PATTERNS<br>• X1 PRINTING CAN BE DESIGNATED. |
| 6 | ENLARGEMENT/ REDUCTION | ON/OFF | • ON/OFF CAN BE AUTOMATICALLY DESIGNATED WHEN PAPER SIZE IS FIXED SIZE OR N-up PRINTING IS SELECTED. |
| 7 | WATERMARK | | • WATERMARK CAN BE DESIGNATED INDIVIDUALLY IN LOGICAL OR PHYSICAL PAGES.<br>• ALL CHAPTERS/PAGES ARE TARGETED. |

FIG. 4B

| | | | |
|---|---|---|---|
| 8 | HEADER/FOOTER | | • HEADER/FOOTER CAN BE DESIGNATED INDIVIDUALLY IN LOGICAL OR PHYSICAL PAGES.<br>• ALL CHAPTERS/PAGES ARE TARGETED. |
| 9 | DELIVERY METHOD | STAPLING/PUNCH HOLE | • STAPLING/PUNCHING ONLY IN SINGLE-/DOUBLE-SIDED PRINTING<br>• STAPLING AT ONE/TWO PORTIONS |
| 10 | DETAILS OF BOOKBINDING | OPENING DIRECTION/SADDLE STITCH/ENLARGEMENT & REDUCTION DESIGNATION/ BINDING MARGIN/FASCICLE DESIGNATION, ETC. | • ONLY IN BOOKBINDING PRINTING |
| 11 | FRONT/BACK COVER | | • PRINTING IS DESIGNATED FOR 1/2 FRONT COVER OR 1/2 BACK COVER.<br>• FEED PORT (INCLUDING INSERTER) IS DESIGNATED. |
| 12 | INDEX PAPER | | • PRINTING OF CHARACTER STRING ON INDEX PORTION OR ANNOTATION ON INDEX PAPER CAN BE SET.<br>• BOOKBINDING PRINTING CANNOT BE DESIGNATED. |
| 13 | INSERTING PAPER | | • FEED PORT (INCLUDING INSERTER) IS DESIGNATED.<br>• DOCUMENT DATA CAN BE PRINTED ON INSERTED PAPER.<br>• BOOKBINDING PRINTING CANNOT BE DESIGNATED. |
| 14 | CHAPTER SEGMENTATION | "NONE"/"PAGE BREAK"/ "PAPER CHANGE" | • "PAPER CHANGE" IS FIXED WHEN INDEX PAPER OR INSERTING PAPER IS DESIGNATED.<br>• "PAPER CHANGE" IN SINGLE-SIDED PRINTING |

FIG. 5

| NO | ATTRIBUTE INFORMATION | | REMARKS |
|---|---|---|---|
| 1 | PAPER SIZE | DOCUMENT SIZE/ FIXED SIZE | • "PAPER CHANGE" IS AUTOMATICALLY DESIGNATED WHEN FIXED SIZE IS SELECTED.<br>• WHEN A PLURALITY OF PAPER SHEETS ARE SELECTED BY BOOK, PAPER SIZE CAN BE CHANGED TO ONLY DESIGNATED PAPER. PAPER SIZE CAN BE CHANGED EVEN WITH DESIGNATION COMPLYING WITH BOOK. |
| 2 | PAPER ORIENTATION | PORTRAIT/LANDSCAPE | • SELECTABLE ONLY FOR FIXED SIZE |
| 3 | N-up PRINTING DESIGNATION | NUMBER OF PAGES/ LAYOUT ORDER/ BORDER LINE/ LAYOUT POSITION, ETC. | • LAYOUT POSITION: NINE PATTERNS<br>• X1 PRINTING CAN BE DESIGNATED. |
| 4 | ENLARGEMENT/ REDUCTION | ON / OFF | • ON/OFF CAN BE AUTOMATICALLY DESIGNATED WHEN PAPER SIZE IS FIXED SIZE OR N-up PRINTING IS SELECTED. |
| 5 | WATERMARK | DISPLAY/NON-DISPLAY | • WHETHER TO DISPLAY ALL WATERMARKS DESIGNATED BY BOOK IS DESIGNATED. |
| 6 | HEADER/FOOTER | DISPLAY/NON-DISPLAY | • WHETHER TO DISPLAY ALL HEADERS/FOOTERS DESIGNATED BY BOOK IS DESIGNATED. |
| 7 | DELIVERY METHOD | STAPLING | • STAPLING CAN BE SET OFF WHEN STAPLING IS DESIGNATED BY BOOK. DEFAULT VALUE IS "ON". |

FIG. 6

| NO | ATTRIBUTE INFORMATION | | REMARKS |
|---|---|---|---|
| 1 | PAGE ROTATION DESIGNATION | | · 0°/90°/180°/270° CAN BE DESIGNATED. |
| 2 | WATERMARK | DISPLAY/NON-DISPLAY | · WHETHER TO DISPLAY ALL WATERMARKS DESIGNATED BY BOOK IS DESIGNATED. |
| 3 | HEADER/FOOTER | DISPLAY/NON-DISPLAY | · WHETHER TO DISPLAY ALL HEADERS/FOOTERS DESIGNATED BY BOOK IS DESIGNATED. |
| 4 | ZOOM | 50%–200% | · MAGNIFICATION RATIO RELATIVE TO SIZE WHICH IS FIT IN VIRTUAL LOGICAL PAGE REGION AND SET AS 100% IS DESIGNATED. |
| 5 | LAYOUT POSITION | | · NINE FIXED PATTERNS, ARBITRARY POSITION IS DESIGNATED. |
| 6 | ANNOTATION | | |
| 7 | VARIABLE ITEM | | |
| 8 | PAGE SEPARATION | | |

1

IMAGE EDITING OF DOCUMENTS WITH IMAGE AND NON-IMAGE PAGES

FIELD OF THE INVENTION

The present invention relates to a technique of combining output data generated by various application programs such as a document editing application and image editing application into one electronic document.

BACKGROUND OF THE INVENTION

As the performance of general-purpose information processing apparatuses such as a personal computer improves, texts, tables, images, and the like can be easily created/edited by various application programs.

In general, texts, simple tables, and the like are created by a document editing application program, images are created by an image editing application program, and tables with relatively complicated operations are created by a spreadsheet application program. In this manner, the user selectively uses an application in accordance with the purpose.

A document for one purpose is formed from only one type of data such as only text, only a table with numerical operations, or only an image, but a situation in which a document containing different types of data is created is increasing.

To prepare a document formed from a plurality of data types, each part of the document is created, edited, and printed by a corresponding application. Then, respective parts are rearranged in intended order and combined.

However, to assign page numbers to pages when the user creates one target document by combining printed materials generated by various applications, the user must print out all necessary data, combine them into a paper document as a printed result, and then determine page numbers to be assigned. Each application writes determined page numbers on respective pages (to be referred to as logical pages or document pages) of a document created by the application. Even if the application program has a function of assigning page numbers, the page numbers of discontinuous pages must be designated by the user. If the pages of the target document are rearranged, page numbers must be reassigned in accordance with the rearrangement. These pages must also be edited and printed again by a corresponding application when not data contents but merely the format is changed so that a plurality of document pages are combined into one page (to be referred to as a physical page or print page) as a print material, or single-sided printing is changed to double-sided printing.

Since an application changes depending on the type of data, the user must manually provide an interface between applications. This means that much labor is demanded of the user, decreasing productivity. Creation of a single purpose document by sharing respective parts between a plurality of individuals using application programs on their respective PCs is especially confusing, and readily causes errors owing to operations by many users.

To solve the above problems, the assignee of the present applicant has proposed the following technique in Japanese Patent Laid-Open No. 2003-91518.

First, as for application programs (e.g., a wordprocessing application and spreadsheet application) or data files created by unknown application programs, a common electronic document file is created using a predetermined device driver as a printer driver on respective applications. Application data files can be converted into an electronic document file of a common format regardless of the type and manufacturer of an application, and pages in the electronic document file can be extracted.

Second, as for versatile image files (e.g., a bitmap file, JPEG file, and Tiff file) whose formats are laid open to the public, images are directly extracted as pages from image files.

One bookbinding data file is created from pages obtained by the first and second processes as pages which form electronic bookbinding data.

In this arrangement, pages which form bookbinding data can be created by any application as far as the application has a printout function, and bookbinding data containing page data created by respective applications can be generated.

To meet the demand for electronic submission, there has recently been proposed a mechanism in which image data scanned by a scanner is processed by importing the image data into a bookbinding application for making ready for a print document. If an original paper document has the mark of a staple or punch hole, the shadow of the mark appears in an image page scanned by a scanner, and the user attempts to erase such unnecessary data from a plurality of image pages with an image editor function.

Attention is paid to bookbinding data in the prior art. Pages contained in bookbinding data include image pages and non-image pages (pages created by a wordprocessing application or the like). An image page has a general-purpose format and requires a simple editing process such as erase of a post-process mark, but whether a page is an image is unknown unless the page is opened.

SUMMARY OF THE INVENTION

It is an object of the present invention to provide a technique capable of constructing bookbinding data containing pages created by respective applications regardless of the type of application, and when one or more desired pages contained in bookbinding data are selected, image editing is designated, but a non-image page exists in the selected pages, excluding the non-image page from the editing targets, shifting the process to image editing, and providing an efficient operation environment to the user.

To achieve the above object, a document processing apparatus according to the present invention comprises the following arrangement. That is, a document processing apparatus which stores and manages, as an electronic document file, document data containing both an image page and a non-image page comprises electronic document file creation means for creating an electronic document file from an imported image file of a predetermined format and an imported application data file, display control means for displaying on a display a list of pages contained in the electronic document file created by the electronic document file creation means, editing means for editing the image page in the electronic document file, determination means for determining for each page which forms a group of selected pages whether a page is an image page or a non-image page when not less than one desired page group is selected as an editing target of the editing means from the pages displayed by the display control means, and control means for performing image editing for a group of pages determined by the determination means to be image pages as an editing target of the editing means.

Other features and advantages of the present invention will be apparent from the following description taken in conjunc-

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 4A and 4B are tables showing a list of book attributes;

FIG. 5 is a table showing a list of chapter attributes;

FIG. 6 is a table showing a list of page attributes;

DETAILED DESCRIPTION OF THE PREFERRED EMBODIMENTS

Preferred embodiments of the present invention will be described in detail below with reference to the accompanying drawings.

Outline of Document Processing System According to First Embodiment

The outline of a document processing system according to the first embodiment will be described with reference to FIGS. 1 to 13.

In the document processing system, a data file created by a general application is converted into an electronic document file by an electronic document writer to be described in the first embodiment. A bookbinding application according to the first embodiment provides a function of editing the electronic document file. In the first embodiment, a general application, electronic document writer, bookbinding application, and electronic document de-spooler are separately described for distinction between these functions. However, a package provided to the user is not limited to them, and an application or graphic engine as a combination of them may be provided, details of which will be described below.

<Example of Software Configuration of Document Processing System According to First Embodiment>

Figure 1:
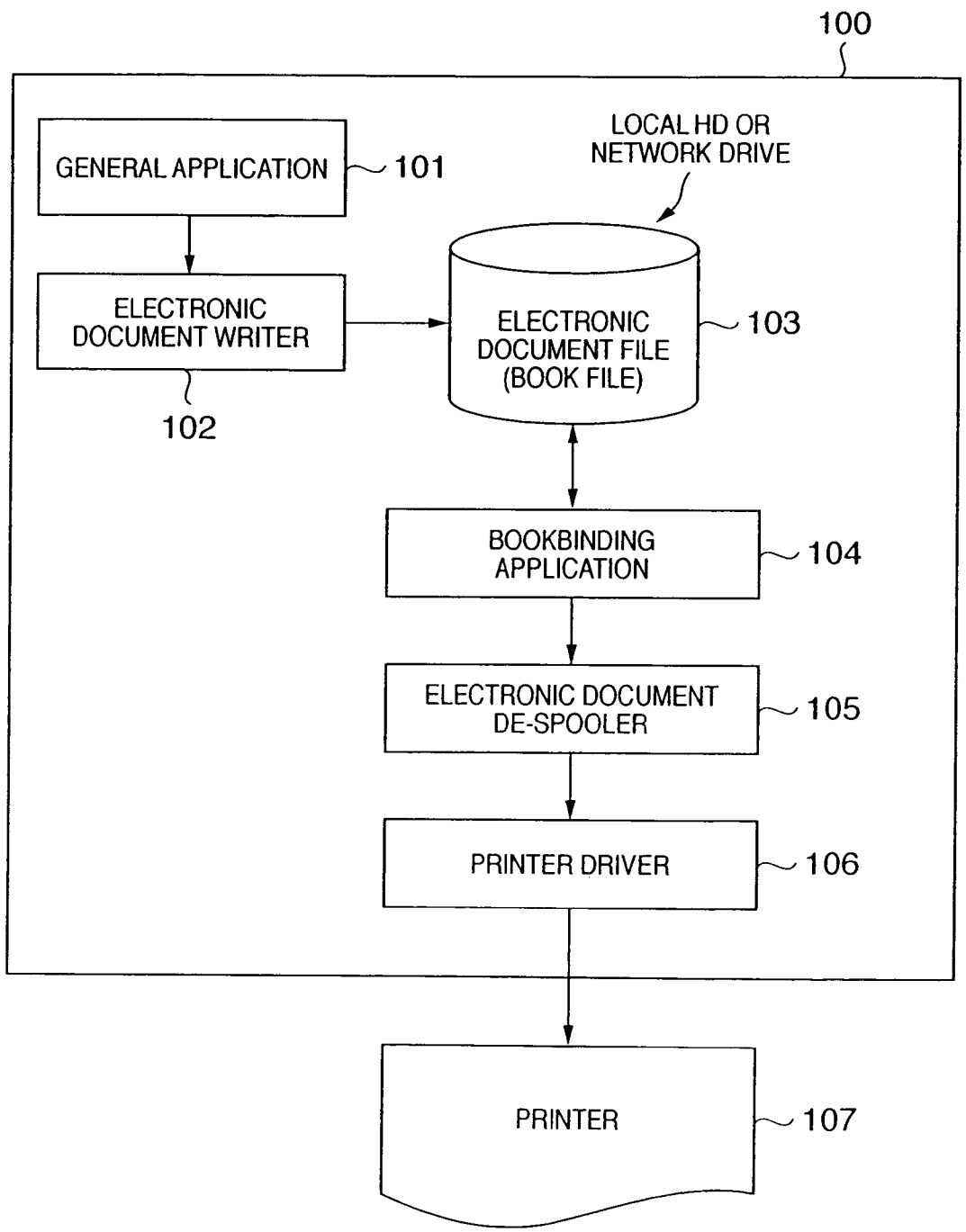
FIG. 1 is a block diagram showing an example of the software configuration of a stand-alone document processing system according to an embodiment.

FIG. 1 is a block diagram showing the software configuration of the document processing system according to the first embodiment.

The main part of the document processing system according to the first embodiment is implemented by a general-purpose information processing apparatus 100 such as a personal computer (to be also referred to as a PC or host computer hereafter). The type and manufacturer of a general application 101 do not matter as far as the application program provides any one function of wordprocessing, spreadsheet, photo-retouch, draw, paint, presentation, and text editing. In other words, any application can be adopted as far as it has a print instruction function to the OS.

Generally, when document data, image data, or the like created by an application is printed by the application, a predetermined interface (generally called GDI) provided by an OS (Operating System) is utilized. To print created data, the application 101 transmits an output command (called a GDI function) which is determined in advance for the output module of the OS providing the interface and has an OS-dependent format. A device driver receives the output command, converts the command into a format processible by an output device such as a printer, and outputs the converted command (called a DDI function). Since data converted by the device driver changes depending on the type of output device, the manufacturer, the model, or the like, a device driver is provided for each output device. The OS converts a command by using the device driver to generate print data, and combines the print data by JL (Job Language) to generate a print job. When the OS is Microsoft Windows®, the output module is a GDI (Graphical Device Interface) module.

An electronic document writer 102 according to the first embodiment is an improvement of the above-mentioned device drivers, and is a software module provided to implement the document processing system. The electronic document writer 102 does not target a specific output device, and converts an output command into a format processible by a bookbinding application 104 or printer driver 106 (to be described later). The format (to be referred to as an "electronic document format" hereinafter) converted by the electronic document writer 102 is not particularly limited as far as each document page can be expressed by a detailed format. Practical standard formats are, for example, the PDF format by Adobe Systems Incorporated, and the SVG format.

When the application 101 utilizes the electronic document writer 102, the electronic document writer 102 is designated (selected) as a device driver used for output, and then caused to execute printing. The electronic document writer 102 and a general printer driver do not make any difference to the application 101. The electronic document writer 102 saves a result processed in the above-described manner as a file 103 in a proper folder (directory).

An electronic document file created by the electronic document writer 102 does not have a complete electronic document file format to be described in the first embodiment. For this reason, the electronic document writer 102 is designated as a device driver by the bookbinding application 104, and executes conversion of application data into an electronic document file under the management of the bookbinding application 104 (details of which will be described later). The bookbinding application 104 completes a new incomplete electronic document file generated by the electronic document writer 102 as an electronic document file having the following format. In case of necessity to definitely discriminate these files, a file created by the electronic document writer 102 will be called an electronic document file, and an electronic document file given a structure by the bookbinding application will be called a book file. If these files need not be particularly discriminated, a document file generated by an application, an electronic document file, and a book file are called document files (or document data).

As described above, the electronic document writer 102 is designated as a device driver, and the general application 101 prints the data. Application data is converted into an electronic document format in pages (to be referred to as "logical pages" or "document pages" hereinafter) defined by the application 101. The converted data is stored as the electronic document file 103 in a storage medium such as a hard disk.

It should be noted that the electronic document writer according to the first embodiment does not make any difference from a printer driver prepared by a general printer manufacturer to the application, as described above. More specifically, a data file of a format processible by the bookbinding application to be described in the first embodiment can be obtained via the electronic document writer 102 according to the first embodiment as far as the application has a printout function regardless of an existing application program or an unknown application which will come into the market in the future.

The bookbinding application 104 according to the first embodiment provides the user with a function of reading and editing the electronic document file or book file 103. The editing function of the bookbinding application 104 according to the first embodiment is not a detailed function of, e.g., editing a text, unlike a wordprocessor, but a simple image editing function and a function of editing a chapter or book structure (to be described later) made up of pages as a minimum unit. Detailed editing such as a change of a font in a text or insertion of a character can be performed again by an original accustomed application.

To print the book file 103 edited by the bookbinding application 104, the bookbinding application 104 activates an electronic document de-spooler 105. The electronic document de-spooler 105 is a program module which is installed in the computer together with the bookbinding application. The electronic document de-spooler 105 is used to output drawing data to a printer driver in printing a document (book file) used by the bookbinding application. The electronic document de-spooler 105 reads out a designated book file from the hard disk. To print each page in a format described in the book file, the electronic document de-spooler 105 generates an output command complying with the output module of the OS described above, and outputs the command to the output module (not shown). At this time, the driver 106 of a printer 107 used as an output device is designated as a device driver. The output module converts the output command received using the designated printer driver 106 of the printer 107 into a device command interpretable by the printer 107. The device command is transmitted to the printer 107, which prints an image corresponding to the command.

<Example of Hardware Configuration of Document Processing System According to First Embodiment>

Figure 2:
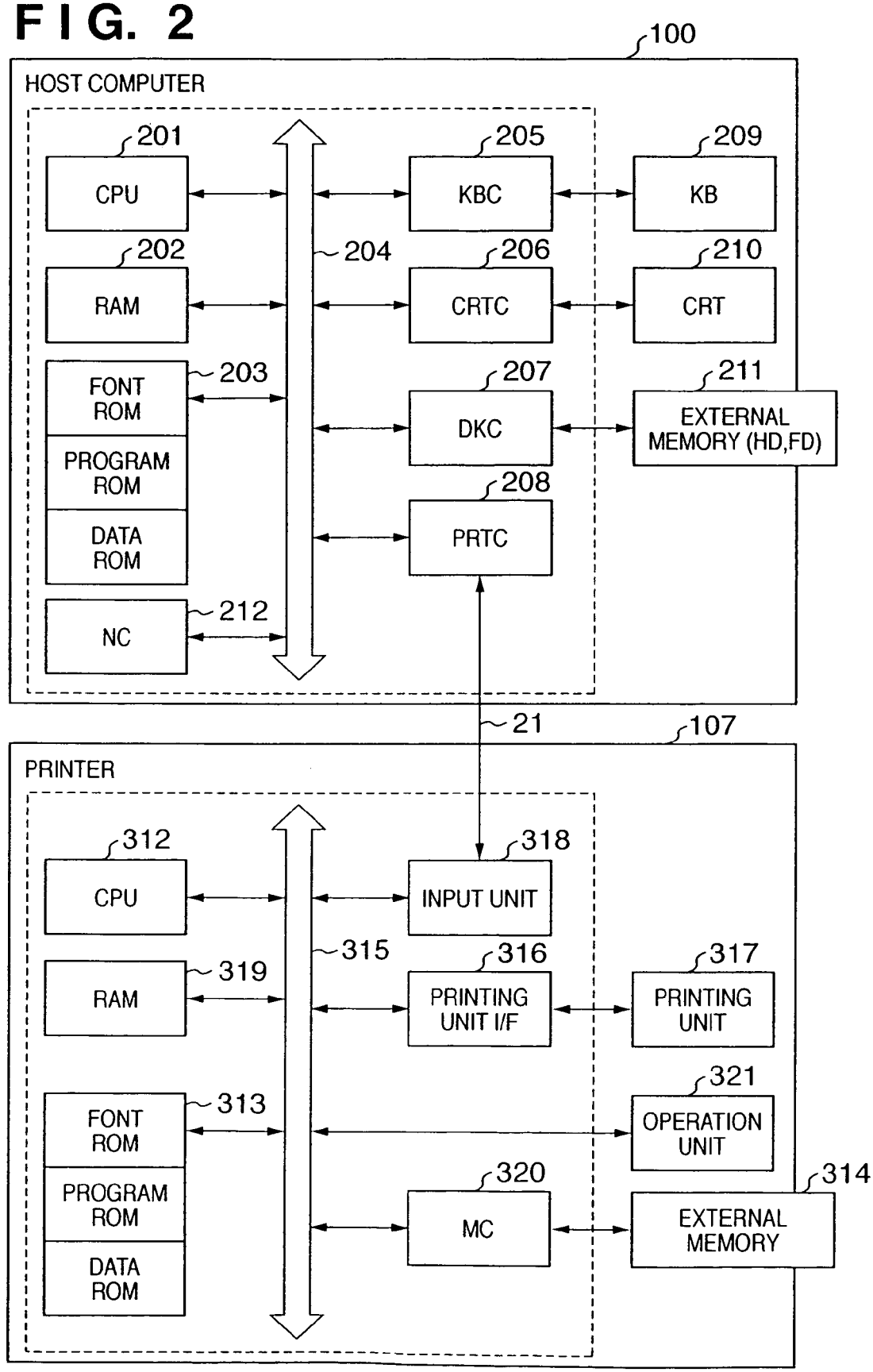
FIG. 2 is a block diagram showing an example of a hardware configuration which implements the document processing system according to the embodiment.

FIG. 2 is a block diagram showing the hardware configuration of the document processing system according to the first embodiment.

In FIG. 2, the PC 100 comprises a CPU 201 which controls elements connected to a system bus 204 and controls the overall apparatus. The CPU 201 executes a document processing program and various applications for figures, images, characters, and tables (including spreadsheets and the like). A ROM 203 stores a BIOS, boot program, basic font data, and various data. An external memory 211 (hard disk device or the like) stores an OS, various programs (general application program 101, electronic document writer 102, bookbinding application 104, electronic document de-spooler 105, and printer driver 106 shown in FIG. 1) to be described in the first embodiment, font data, and data files created by various applications. A RAM 202 functions as a main memory, work area, or the like for the CPU 201. When the apparatus is powered on, the CPU 201 loads an OS from the external memory 211 to the RAM 202 in accordance with a boot program in the ROM 203, then loads various applications and programs to be described in the first embodiment, and functions as an information processing apparatus.

A keyboard controller (KBC) 205 controls a key input from a keyboard 209 or a pointing device (not shown). A CRT controller (CRTC) 206 controls the display of a CRT display (CRT) 210. A disk controller (DKC) 207 controls access to the external memory 211 which stores a boot program, various applications, font data, user files, edited files, a printer control command generation program (to be referred to as a printer driver hereinafter), and the like. A printer controller (PRTC) 208 is connected to the printer 107 via a bidirectional interface (interface) 21, and executes a communication control process with the printer 107. An NC (Network Controller) 212 communicates with a network, and executes a communication control process with another device connected to the network.

The CPU 201 executes, e.g., an outline font rasterization process to a display information RAM set in the RAM 202, and enables WYSIWYG on the CRT 210. The CPU 201 opens various registered windows and executes various data processes on the basis of commands designated on the CRT 210 with a mouse® cursor (not shown) or the like. When the user executes printing, he/she opens a print setting window, and can perform setting of a printer and setting of a printing process method to the printer driver that includes selection of a print mode.

The printer 107 comprises a CPU 312 which controls the entire printer. The CPU 312 outputs an image signal as output information to a printing unit (printer engine) 317 connected to a system bus 315 on the basis of a control program stored in a program ROM within a ROM 313 or a control program stored in an external memory 314. The program ROM within the ROM 313 stores, e.g., the control program of the CPU 312. A font ROM within the ROM 313 stores, e.g., font data used to generate the output information. A data ROM within the ROM 313 stores, e.g., information used in the host computer for a printer having no external memory 314 such as a hard disk.

The CPU 312 can communicate with the host computer via an input unit 318, and notify the host computer 100 of internal printer information or the like. A RAM 319 functions as a main memory, work area, or the like for the CPU 312, and the memory capacity can be expanded by an optional RAM connected to an expansion port (not shown). The RAM 319 is used as an output information mapping area, environment data storage area, NVRAM, or the like. Access to the external memory 314 such as a hard disk (HD) or IC card is controlled by a memory controller (MC) 320. The external memory 314 is connected as an option, and stores font data, emulation programs, form data, and the like. Reference numeral 321 denotes an operation panel described above which is equipped with operation switches, an LED display, and the like.

The number of external memories 314 is not limited to one, and a plurality of external memories 314 may be arranged. A plurality of external memories which store an option card and a program for interpreting the printer control languages of different language systems in addition to built-in fonts may be connected. Further, an NVRAM (not shown) may be adopted to store printer mode setting information from the operation unit 321.

<Example of Format of Electronic Document Data>

Before referring to details of the bookbinding application 104, the data format of a book file will be explained. The book file has a three-layered structure similar to a paper-medium book. The upper layer is called a "book", resembles one book, and defines the attributes of the entire book. The intermediate layer corresponds to a chapter in the book, and is also called a "chapter". As for each chapter, its attributes can be defined. The lower layer is a "page", and corresponds to each page defined by an application program. As for each page, its attributes can be defined. One book may contain a plurality of chapters, and one chapter may contain a plurality of pages.

Figure 3:
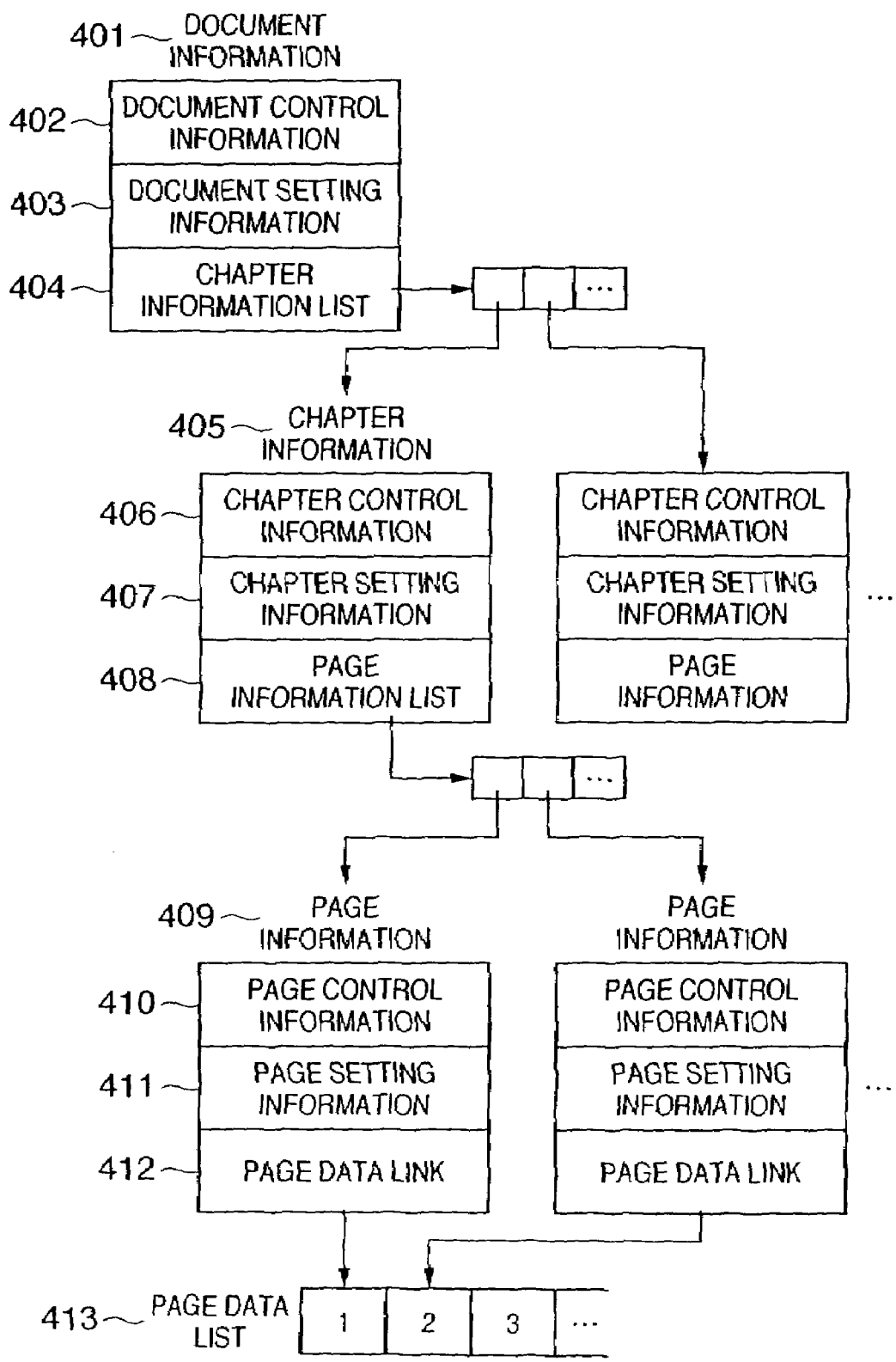
FIG. 3 is a view showing an example of a book file structure.

FIG. 3 is a view schematically showing an example of the book file format. A book, chapter, and page in the book file of this example are represented by corresponding nodes. One book file contains one book. The book and chapter are a concept for defining a book structure, and contain, as entities, defined attribute values and links to lower layers. The page has, as entities, data of each page output from an application program. The page contains a document page entity (document page data) and a link to each document page data in addition to an attribute value. Note that a print page to be output to a paper medium may contain a plurality of document pages. This structure is displayed not by a link, but by attributes in book, chapter, and page layers.

The book file shown in FIG. 3 need not be one completed book, but can be repetitively edited. Thus, "book" is generalized as a "document" in FIG. 3.

Document information 401 is defined at the top. The document information 401 can be roughly divided into three parts 402 to 404. The document control information 402 holds information such as the path name in the file system of a document file. The document setting information 403 holds layout information such as the page layout, and function setting information of a printing apparatus such as stapling, and corresponds to book attributes. The chapter information list 404 holds as a list a set of chapters which form a document. The list holds chapter information 405.

The chapter information 405 can also be roughly divided into three parts 406 to 408. The chapter control information 406 holds information such as the chapter name. The chapter setting information 407 holds information on the page layout and stapling unique to the chapter, and corresponds to chapter attributes. By holding setting information for each chapter, a document having a complicated layout can be created so that the first chapter has a 2UP layout and the remaining chapters have a 4UP layout. The page information list 408 holds as a list a set of document pages which form each chapter. The page information list 408 designates page information data 409. Note that "2UP" means a layout of two pages created by a general application on one page created by the bookbinding application 104 according to the first embodiment. "4UP" means a state in which 4-page data created by a general application are laid out in 2×2 on one page created by the bookbinding application. "Nup" means a state in which N logical pages are laid out on one print sheet.

In FIG. 3, one logical page subjected to printing via the electronic document writer 102 by the application program corresponds to one page by the bookbinding application 104. For example, for 4UP, a page data link 412 stores link information of four logical pages.

The page information data 409 is also roughly divided into three parts 410 to 412. The page control information 410 holds information such as a page number displayed at the tree. The page setting information 411 holds information such as the page rotation angle and page layout position information, and corresponds to document page attributes. The page link information 412 is document data corresponding to a page. In this example, the page information 409 does not directly have document data, but has only the link information 412. Actual document data is held by a page data list 413.

FIGS. 4A and 4B show an item list of settable book attributes (document setting information 403). In general, as for an item which can be defined repetitively on lower and upper layers, the attribute value of the lower layer is preferentially adopted. In other words, setting items on the upper layer are reflected in items whose attributes are not particularly set on the lower layer. As for an item which is set effective only for a book attribute, a value defined in the book attribute is effective throughout the book. In this example, when an attribute item has different settings on lower and upper layers, which of the settings is given priority can be selected (to be described later). Each item shown in FIGS. 4A and 4B does not correspond to one concrete item, but may contain a plurality of relevant items.

Items unique to the book attribute are six items: printing method, details of bookbinding, front/back cover, index paper, inserting paper, and chapter segmentation. These items are defined throughout the book. As the printing method attribute, three values, i.e., single-sided printing, double-sided printing, and bookbinding printing can be designated. Bookbinding printing is a method of printing in a format which allows bookbinding by bundling a separately designated number of paper sheets, folding the bundle into two, and binding the bundle. As the detailed bookbinding attribute, the opening direction and the number of paper sheets to be bundled can be designated when bookbinding printing is designated.

The front/back cover attribute includes designation of adding paper sheets serving as front and back covers when an electronic document file combined as a book is printed, and designation of contents to be printed on the added paper sheets. The index paper attribute includes designation of inserting tabbed index paper separately prepared in a printing apparatus for chapter segmentation, and designation of contents to be printed on the index (tabbed) portion. This attribute becomes effective when a printing apparatus for use is equipped with an inserter having an inserting function of inserting a paper sheet prepared separately from a print sheet into a desired position, or when a plurality of sheet cassettes can be used. This also applies to the inserting paper attribute.

The inserting paper attribute includes designation of inserting a paper sheet fed from an inserter or sheet feed cassette for chapter segmentation, and designation of a sheet feed source when inserting paper is inserted.

The chapter segmentation attribute includes designation of whether to use a new paper sheet, use a new print page, or do nothing particular at a chapter break. In single-sided printing, the use of a new paper sheet and the use of a new print page are the same. In double-sided printing, successive chapters are not printed on one paper sheet if "the use of a new paper sheet" is designated, but may be printed on the obverse and reverse of one paper sheet if "the use of a new print page" is designated.

FIG. 5 shows a list which can be set by the chapter attribute (chapter setting information 407), and FIG. 6 shows a list which can be set by the page attribute (page setting information 411). The relationship between the chapter attribute and the page attribute is the same as that between the book attribute and the lower layer attribute.

As for the chapter attribute, there is no item unique to the chapter, and all items overlap those of the book attribute. In general, if the definition of the chapter attribute is different from that of the book attribute, a value defined by the chapter attribute precedes. In this example, however, whether to preferentially adopt the attribute value of a lower layer can be selected (to be described later).

Items common to only the book and chapter attributes are five items: paper size, paper orientation, Nup printing designation, enlargement/reduction, and delivery method. As described above, the Nup printing designation attribute is an item for designating the number of document pages contained in one print page. Layouts which can be designated are 1×1, 1×2, 2×2, 3×3, 4×4, and the like. The delivery method attribute is an item for designating whether to staple discharged paper sheets. The effectiveness of this attribute depends on whether a printing apparatus for use has a stapling function.

Items unique to the page attribute are a page rotation attribute, zoom, layout designation, annotation, and page separation. The page rotation attribute is an item for designating the rotation angle when a document page is laid out on a print page. The zoom attribute is an item for designating the variable magnification ratio of a document page. The variable magnification ratio is designated based on a virtual logical page region size=100%. The virtual logical page region is a region occupied by one document page when document pages are laid out in accordance with Nup designation or the like. For example, the virtual logical page region is a region corresponding to one print page for 1×1, and a region obtained by reducing each side of one print page to about 70% for 1×2.

Attributes common to the book, chapter, and page are a watermark attribute and header/footer attribute. The watermark is a separately designated image or character string printed over data created by an application. The header/footer is a watermark printed at the upper or lower margin of each page. For the header/footer, items such as a page number, and date and time which can be designated by variables are prepared. Contents which can be designated by the watermark attribute and header/footer attribute are common between the chapter and the page, but are different from those of the book. The book can set the watermark and header/footer contents, and designate how to print a watermark or header/footer throughout the book. To the contrary, the chapter and page can only designate whether to print a watermark or header/footer set by the book on the chapter or page.

The configuration as a premise for the first embodiment, and the book file structure created by the bookbinding application have been described. The bookbinding application according to the first embodiment will be explained in more detail.

<Example of Operation Sequence of Document Processing System According to First Embodiment>

A sequence of creating a book file by the bookbinding application 104 and electronic document writer 102 will be explained. Creation of a book file is realized as part of book file editing operation by the bookbinding application 104.

Figure 7:
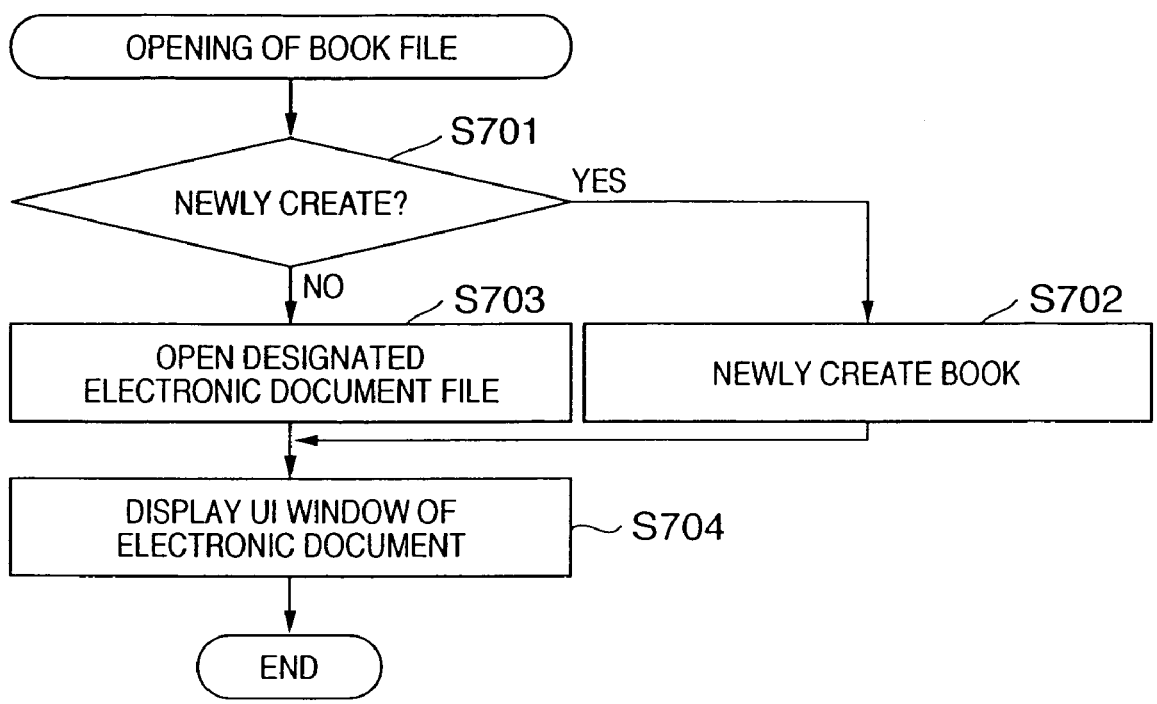
FIG. 7 is a flowchart showing an example of a sequence of opening a book file.

FIG. 7 is a flowchart showing a sequence when the bookbinding application 104 opens a book file.

Figure 8:
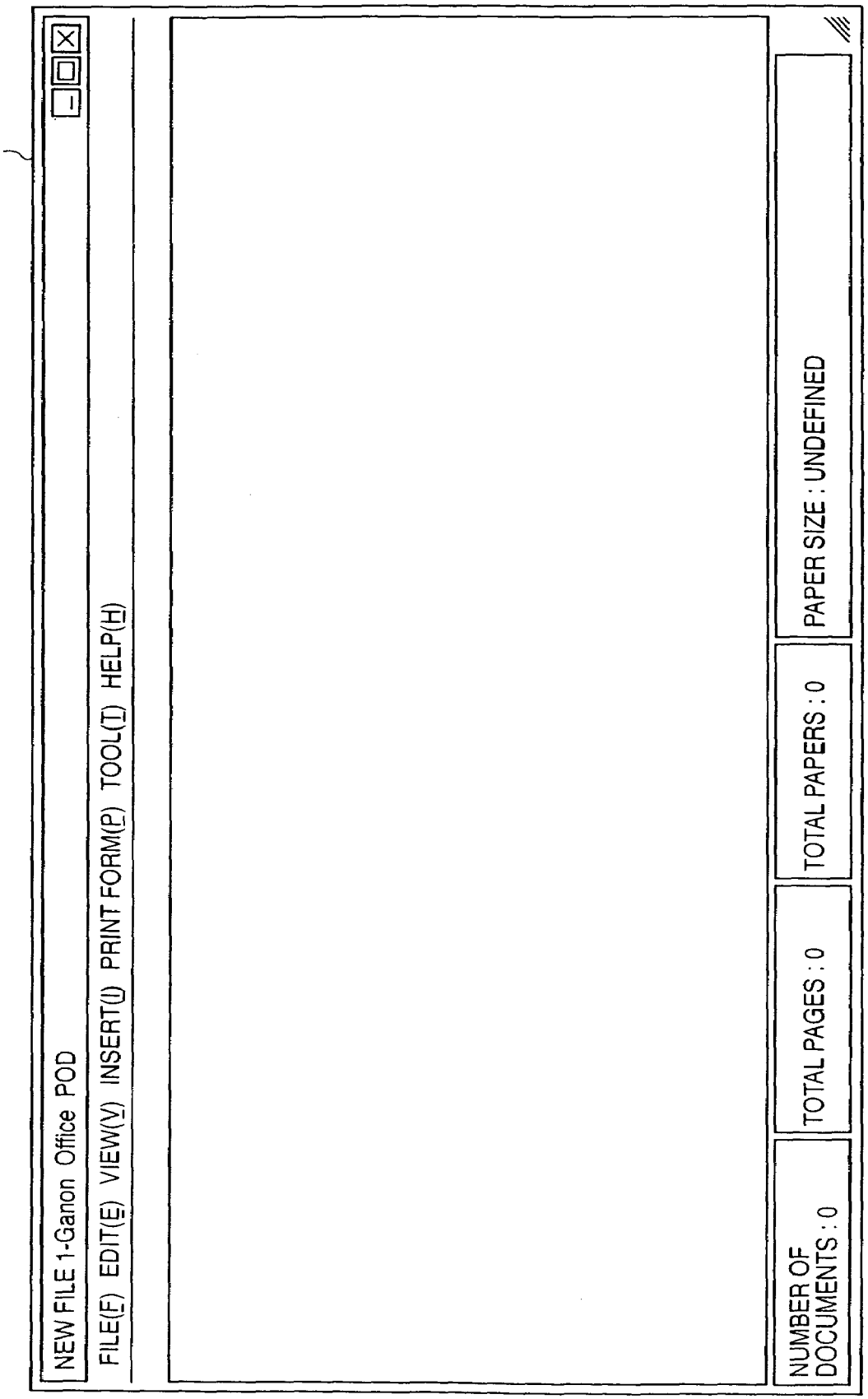
FIG. 8 is a view showing an example of a user interface window when a new book file is opened.

Whether a book file to be opened is one to be newly created or an existing one is determined (step S701). If the book file is one to be newly created, a book file containing no chapter is newly created (step S702). In the example shown in FIG. 3, the newly created book file has only a book node 301 which does not have any link to a chapter node. The book attribute is set by the user according to need, but default settings are applied to a new document. A UI (User Interface) window for editing the new book file is displayed (step S704). FIG. 8 shows an example of a UI window when a book file is newly created. In this case, the book file does not have any substantial content, and a UI window 800 does not display anything.

Figure 9:
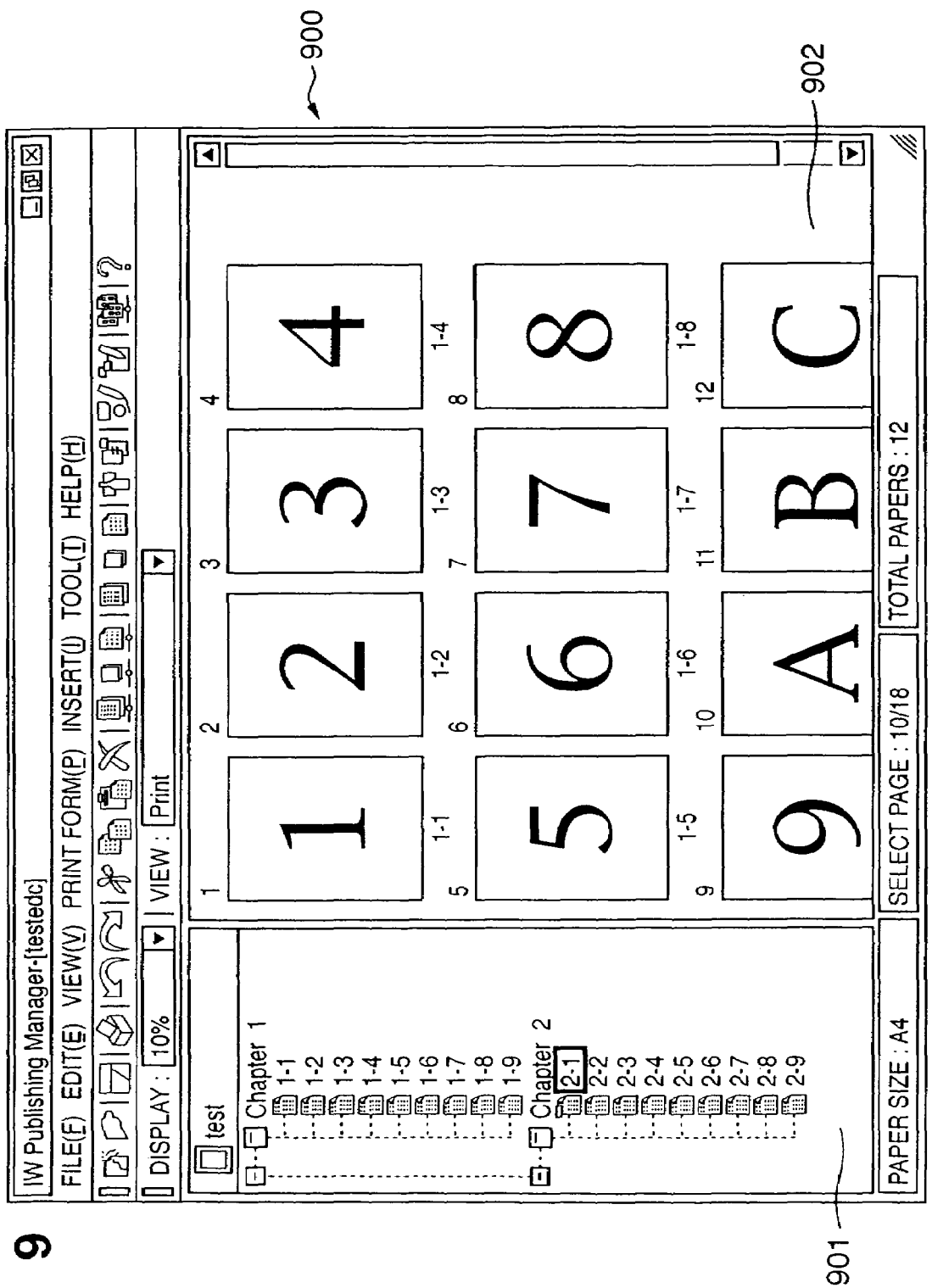
FIG. 9 is a view showing an example of a user interface window when an existing book file is opened.

If the book file is an existing one, the user designates the book file. Upon designation, the book file is opened (step S703), and a UI (User Interface) window is displayed in accordance with the structure, attributes, and contents of the book file. FIG. 9 shows an example of the UI window. A UI window 900 has a tree portion 901 representing a book structure, and a preview portion 902 displaying a state to be printed. The tree portion 901 displays chapters contained in the book and pages contained in each chapter so as to present a tree structure as shown in FIG. 3. Pages displayed at the tree portion 901 are document pages. The preview portion 902 displays reduced print page contents. The display order reflects the book structure.

Application data converted into an electronic document file by the electronic document writer 102 can be added as a new chapter to the open book file (also including a newly created book file). This function is called an electronic document import function. The electronic document is imported to the book file newly created by the sequence of FIG. 7, giving an entity to the book file. This function is activated by selecting "import" from a menu prepared in the window of FIG. 8 or 9, or dragging and dropping application data into the window of FIG. 8 or 9.

The type of file to be dragged and dropped does not matter as far as the file is a data file created by a general application program. The application which creates the data file is assumed to be installed in the PC 100. When the structure (format) of a file to be dragged and dropped is laid open to the public, for example, the file is a general-purpose data file with an extension "jpg", "bmp", "tiff", "pdf", or the like, the file can be interpreted by the bookbinding application 104 of the first embodiment, and the application which creates the file is not always necessary. The general-purpose file is limited to a file having a data structure supported by the bookbinding application 104. For a data file having another structure, an application which creates and edits the data file must be installed.

Figure 10:
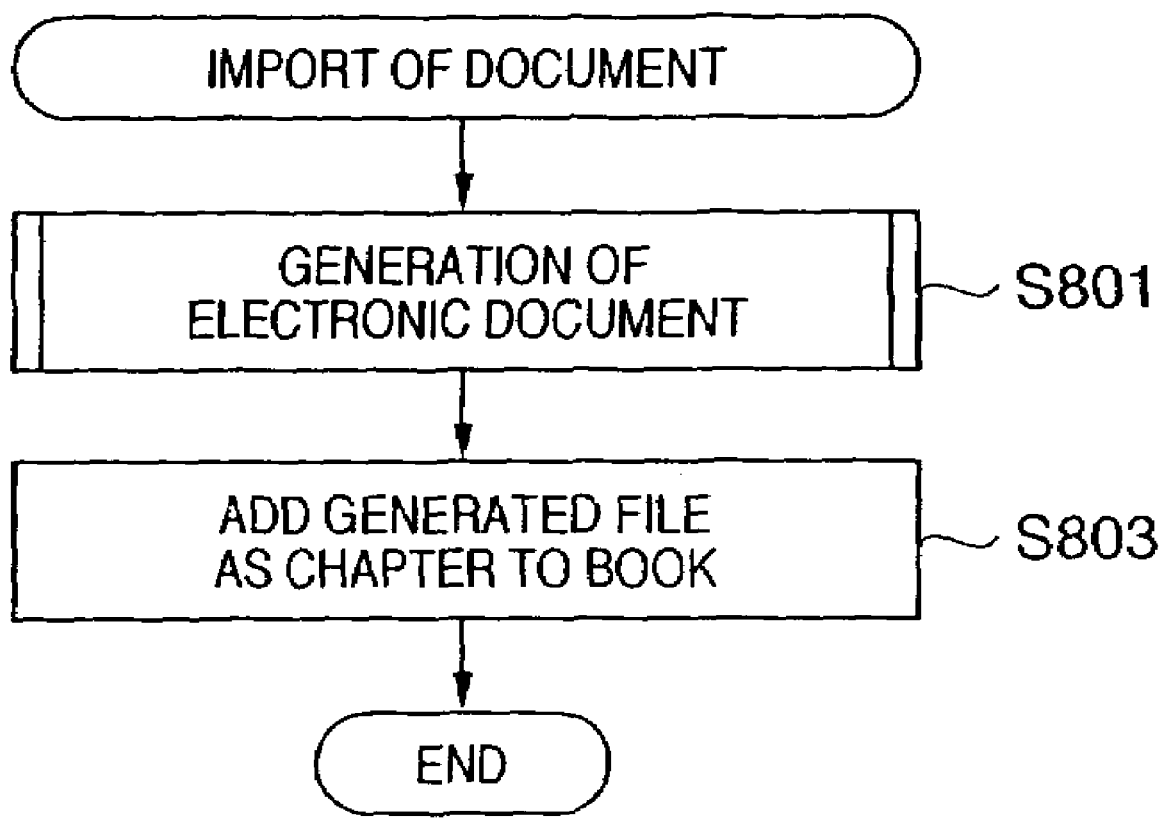
FIG. 10 is a flowchart showing an example of a sequence of importing an electronic document file to a book file.

FIG. 10 is a flowchart showing an example of a sequence of importing an electronic document file and image file.

The electronic document writer 102 converts an application data file input from the application 101 into electronic document data (step S801). After conversion, the bookbinding application 104 adds the electronic document file 103 generated in step S801 as a new chapter to the book of a currently open book file (step S803). As for chapter attributes which are common to book attributes, the values of the book attributes are generally copied. As for uncommon chapter attributes, predetermined default values are set. In this example, whether to preferentially adopt the attribute value of a lower layer can be selected (to be described later).

If a book file is newly created, a new chapter is created, and each page of the electronic document file is added as a page belonging to the chapter. As for page attributes, attributes common to the attributes of an upper layer are generally given the attribute values of the upper layer, and attributes which are defined in application data and inherited to an electronic document file are given values defined in the application data. For example, when Nup designation is defined in application data, the page inherits this attribute value. In this way, a new book file is created, or a new chapter is added. In this example, however, whether to preferentially adopt the attribute value of a lower layer can be selected (to be described later).

Figure 11:
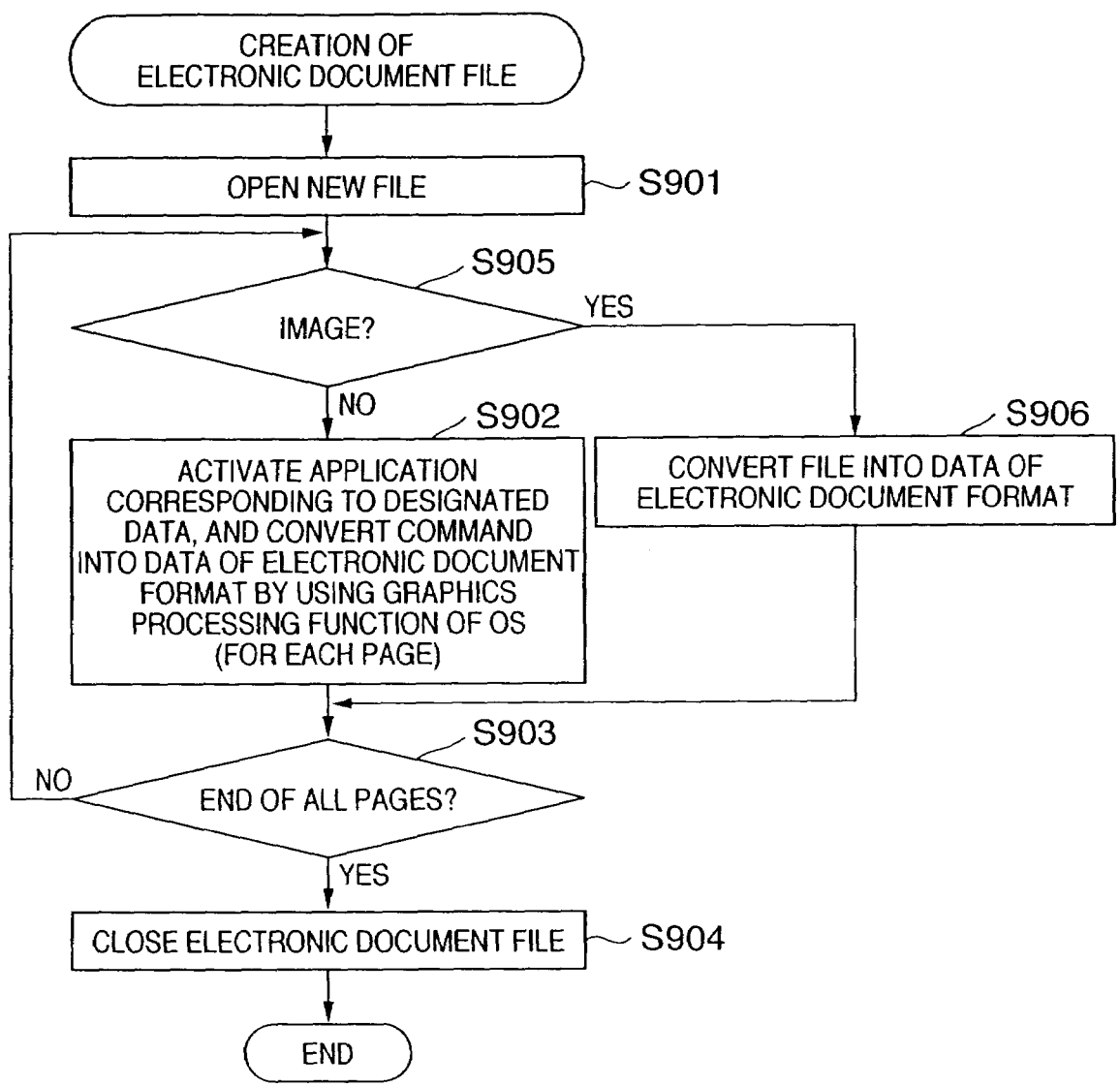
FIG. 11 is a flowchart showing an example of a sequence of converting application data into an electronic document file in step S801 of FIG. 10.

FIG. 11 is a flowchart showing a sequence of generating an electronic document file by the electronic document writer 102 and bookbinding application 104 in step S801 of FIG. 10. This process is executed when a document file or image file is dragged and dropped to the shortcut (not shown) of the bookbinding application 104 or the window of the bookbinding application 104 that is displayed on the display while the bookbinding application 104 is activated.

The bookbinding application 104 creates and opens a new electronic document file (step S901). The bookbinding application 104 determines whether the data file to be converted is an image data file (step S905). This determination can be done on the basis of the file extension of the data file under the Windows OS. For example, the extension "bmp" represents Windows bitmap data; "jpg", JPEG-compressed image data; "tiff", tiff image data. Also, the head of data to be converted can be analyzed. Data of these formats can be directly imported into the bookbinding application 104.

If the data file is determined not to be image data, the bookbinding application 104 activates via the OS an application corresponding to the extension of the data file, sets the electronic document writer 102 as a device driver for the application, and transmits an output command to an OS output module. The output module converts the received output command into data of an electronic document format by the electronic document writer 102, and outputs the converted data (step S902). The output destination is the electronic document file newly opened in step S901 by the bookbinding application 104.

If the data file is determined to be an image data file, the process advances to step S905, and the electronic document writer 102 directly generates electronic document data from the image data and outputs the electronic document data to the electronic document file opened in step S901. Note that the electronic document writer 102 supports image data of a general-purpose format described above, and can directly generate an electronic document file. For example, a PDF writer available from Adobe Systems also has the same function of generating a PDF file from an image format.

The bookbinding application 104 determines whether all designated data have been converted (step S903), and if YES in step S903, closes the electronic document file (step S904). The electronic document file generated by the sequence shown in FIG. 11 is configured as a file containing original page data entities shown in FIG. 3.

In this manner, a new book file is created. When a data file is newly dropped while the bookbinding application 104 opens an existing electronic document file, the new data file is added as a new chapter if the data file is application data, or as a new page to the final chapter if the data file is image data. In this example, whether to preferentially adopt the attribute value of a lower layer can be selected (to be described later).

For example, when a data file for a wordprocessing application is converted into an electronic document file, one chapter containing a plurality of pages is created in the electronic document file. When an unnecessary page exists in the created chapter, the bookbinding application issues an instruction to delete the page, leaving only necessary pages.

By repeating the above process for necessary application data files, a chapter is created for each imported file, and a page is created below the chapter. From this, it is understood that a book containing pages created by different applications can be created.

<Example of Editing Book File>

As described above, a book file can be created from application data. Chapters and pages in the generated book file can be edited as follows.

(1) New document
(2) Delete
(3) Copy
(4) Cut
(5) Paste
(6) Move
(7) Change chapter name
(8) Reassign page number/name
(9) Insert cover
(10) Insert inserting paper
(11) Insert index paper
(12) Page layout of each document page
(13) Editing of image page In addition, an operation of canceling executed editing operation, and an operation of restoring canceled operation can be performed. These editing functions enable editing operations such as consolidation of a plurality of book files, rearrangement of chapters and pages within a book file, delete of chapters and pages within a book file, layout change (to 2UP or the like) of a document page, and insertion of inserting paper and index paper. By these operations, operation results are reflected in attributes shown in FIGS. 4 to 6 or in the structures of the book file. For example, a blank page is inserted to a designated portion by an operation of newly adding a blank page. The blank page is processed as a document page. If the layout of a document page is changed, the change contents are reflected in attributes such as the printing method, N-up printing, front/back cover, index paper, inserting paper, and chapter segmentation. Also, a page in a given chapter can be moved to another chapter (page is dragged and dropped to another chapter).

A display and operation example in editing will be described in detail below.

<Example of Output of Book File>

The ultimate goal of a book file created and edited in the above manner is to print out the file. If the user selects a file menu from the UI window 900 of the bookbinding application shown in FIG. 9 and selects printing from this menu, the book file is then printed out by a designated output device. At this time, the bookbinding application 104 creates a job ticket from a currently open book file, and transfers the job ticket to the electronic document de-spooler 105. The electronic document de-spooler 105 converts the job ticket into an OS output command, e.g., a Windows GDI command, and transmits the command to an output module, e.g., GDI. The output module generates a command complying with a device by the designated printer driver 106, and transmits the command to the device.

The graphic engine of the output module (not shown) loads the printer driver 106 prepared for each printing apparatus from the external memory 211 to the RAM 202, and sets the output to the printer driver 106. The output module converts the received GDI (Graphic Device Interface) function into a DDI (Device Driver Interface) function, and outputs the DDI function to the printer driver 106. The printer driver 106 converts the received output into a control command such as a PDL (Page Description Language) command recognizable by the printer on the basis of the DDI function received from the output module. The converted printer control command passes through a system spooler loaded by the OS to the RAM 202, and is output as print data to the printer 107 via the interface 21.

The job ticket is data having a structure whose minimum unit is a document page. The structure of the job ticket defines the layout of a document page on a paper sheet. One job ticket is issued for one print job. The document node is set at the top of the structure, and defines the attribute of the whole document such as double-sided printing/single-sided printing. This node is accompanied with a paper node containing attributes such as the identifier of paper for use and designation of a feed port in the printer. Each paper node is accompanied with a sheet node which is printed on the paper. One sheet corresponds to one paper sheet. A print page (physical page) belongs to each sheet. One physical page belongs to one sheet in single-sided printing, and two physical pages belong to one sheet in double-sided printing. A document page to be laid out on a physical page belongs to the physical page. The physical page attribute contains a document page layout.

Figure 12:
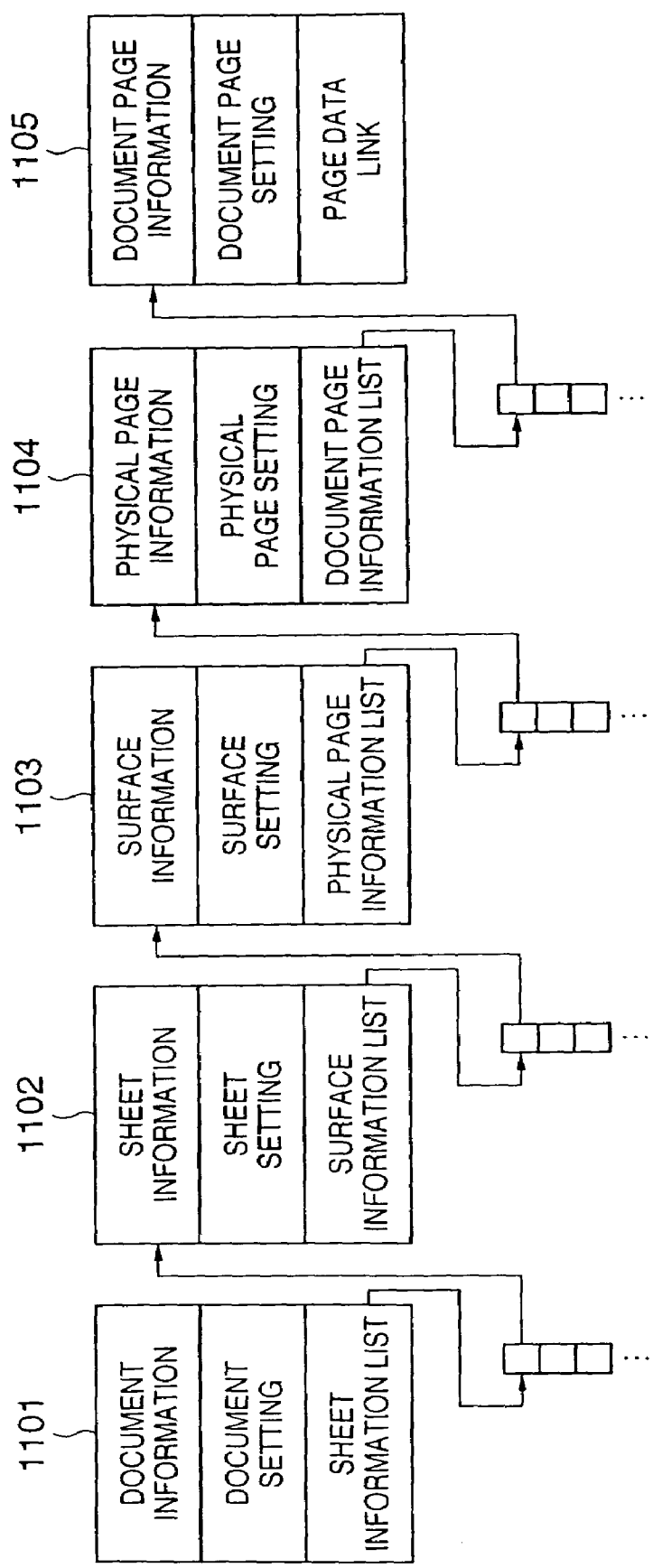
FIG. 12 is a view showing an example of a data structure used for printing and display.

FIG. 12 shows an example of the data structure of a job ticket. In print data, a document is formed from a set of sheets, and each sheet is formed from two, upper and lower surfaces. Each surface has a region (physical page) for laying out a document, and each physical page is formed from a set of document pages serving as minimum units. Reference numeral 1101 denotes data corresponding to a document. The data 1101 is made up of data on a whole document and a list of sheet information forming the document. Sheet information 1102 is formed from information on a sheet such as the sheet size, and a list of surface information laid out on the sheet. Surface information 1103 is formed from data unique to a surface, and a list of physical pages laid out on the surface. Physical page information 1104 is formed from information such as the size and header/footer of a physical page, and a list of document pages which form the physical page.

The electronic document de-spooler 105 converts the job ticket into an output command to an output module.

<Example of Preview Display Contents>

As described above, when a book file is opened by the bookbinding application, the user interface window 900 shown in FIG. 9 is displayed. The tree portion 901 displays a tree representing the structure of the open book (to be referred to as a "book of interest" hereinafter). At the preview portion according to the first embodiment, three display methods are prepared in accordance with designation by the user. The first method is a mode called a document view which directly displays document pages. In the document view mode, the contents of document pages belonging to the book of interest are reduced and displayed. The display of the preview portion does not reflect any layout. The second method is a printing view mode. In the printing view mode, the preview portion 902 displays document pages in a format which reflects the layout of them. The third method is a simple printing view mode. In the simple printing view mode, the contents of document pages are not reflected in the display of the preview portion, but only the layout is reflected. Switching between these display modes can be designated from a pull-down menu displayed by clicking "view" on the menu bar of the bookbinding application.

<Another Example of Configuration of Document Processing System>

The document processing system according to the first embodiment is of a stand-alone type. A server-client system as an extension of the stand-alone system also creates and edits a book file by almost the same configuration and sequence. A book file and printing process are managed by the server.

Figure 13:
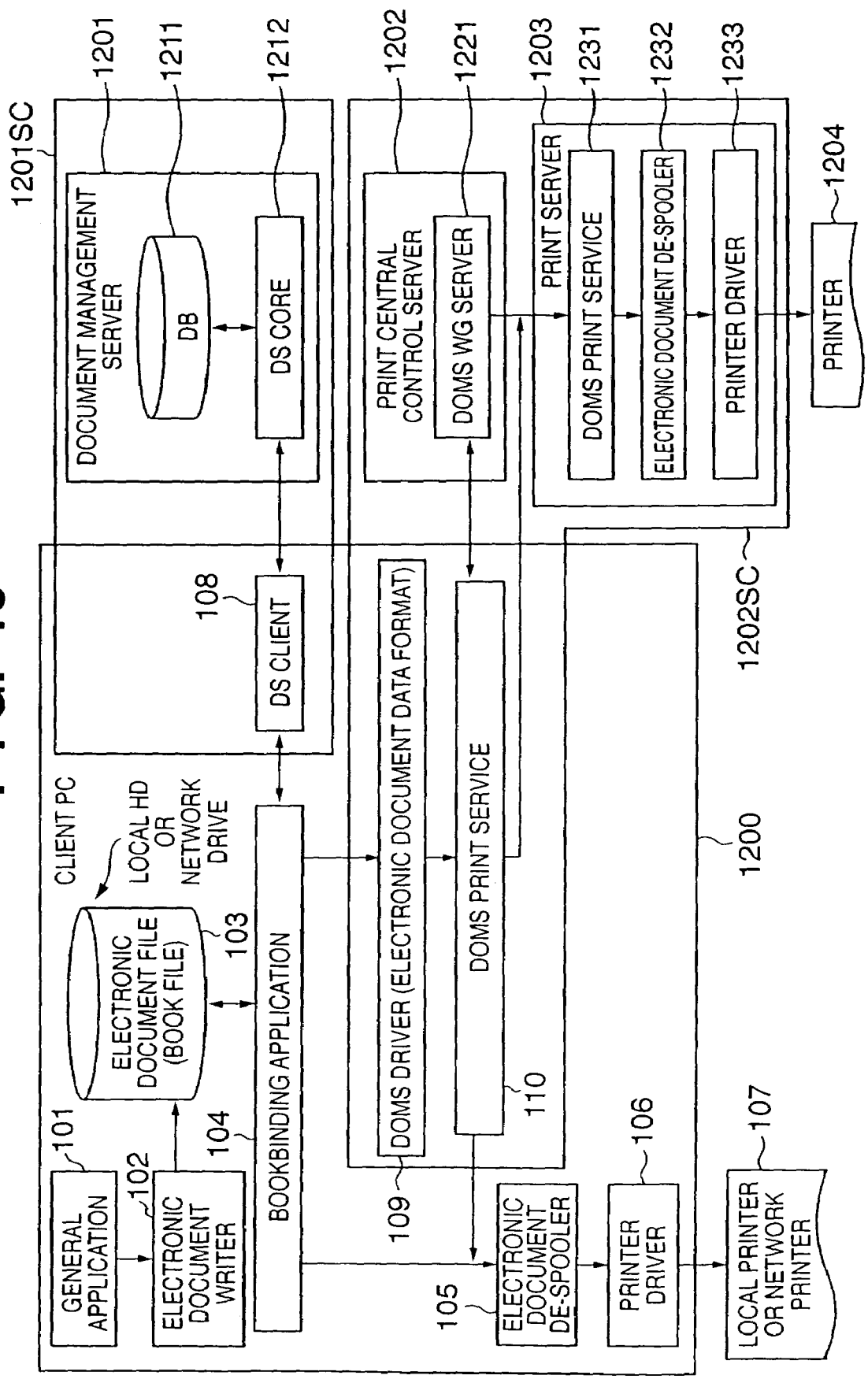
FIG. 13 is a block diagram showing an example of the software configuration of a client-server document processing system.

FIG. 13 is a block diagram showing the configuration of a server-client document processing system.

The client document processing system is constituted by adding to the stand-alone system a DOMS (Document Output Management Service) driver 109 serving as a client module, a DOMS print service module 110, and a DS (Document Service) client module 108. A client document processing system 1200 is connected to a document management server 1201, print central control server 1202, and print server 1203. These servers are generally connected to the client document processing system via a network. When the servers also function as clients, they are connected by interprocess communication which simulates communication between networks. The document management server 1201 and print central control server 1202 are connected to the client in FIG. 13, but only either one may exist on the network. If the connected server is the document management server, a document management server-client system 1201SC including a client module is added to the stand-alone document management system. If the connected server is the print central control server 1202, a printing management server-client system 1202SC including a client module is added.

The document management server 1201 stores a book file created and edited by the bookbinding application 104. To manage a book file by the document management server 1201, the book file is saved in a database 1211 of the document management server 1201 instead of or in addition to the local HD of a client PC. Save and read of a book file between the bookbinding application 104 and the document management server 1201 are done via the DS client 108 and a DS core 1212.

The print central control server 1202 manages printing of a book file stored in the client document management system 1200 or document management server 1201. A print request from the client is transmitted to a DOMS WG server module 1221 of the print central control server 1202 via the DOMS driver 109 and DOMS print service module 110. To print by the printer of the client, the print central control server 1202 transfers electronic document data to the electronic document de-spooler 105 via the DOMS print service module 110 of the client. To print by the print server 1203, the print central control server 1202 transmits electronic document data to a DOMS print service module 1231 of the print server 1203. For example, the print central control server executes security check on the qualification of a user who has issued a print request for a saved book file, or saves the printing process log. In this fashion, the document processing system can be implemented as both a stand-alone system and client-server system.

<Image Page Editing Process>

As described above, the bookbinding application 104 in FIG. 1 provides the user with a function of reading and editing the electronic document file or book file 103. Pages imported into the book file 103 are formed from image pages directly converted from an image file into a document file, and non-image pages output from an application via the electronic document writer 102. As described above, each page can be moved from a given chapter to another chapter by editing, and even one chapter contains both image pages and non-image pages.

A general image editing application is activated by dragging and dropping an image data file to the application program or its icon, and the image data is opened and displayed. This function is based on the premise that a dragged/dropped file is an image file recognizable by the application. That is, when a file irrelevant to the image application is dragged and dropped, an error occurs, or the file is ignored and only the application is activated.

In the first embodiment, bookbinding data is managed by the OS, but pages which form the bookbinding data are managed by the bookbinding application 104. By utilizing this point, the bookbinding program 104 according to the first embodiment is characterized by, when a plurality of pages are selected and image editing is designated, subjecting to image editing only image pages prepared by excluding non-image pages from the selected pages.

The printing control system of the present invention considers a process of importing image data scanned by a scanner into the bookbinding application 104, managing the image data as an electronic document file also containing another application data, and making ready for printing. The printing control system tries to erase a post-process mark such as a staple mark or punch hole on an original paper document during make-ready. Hence, the purpose of the present invention is to permit image editing for properly only image pages when the user arbitrarily selects a plurality of pages of a chapter or the like from an electronic document containing both non-image pages and image pages, and performs image editing.

Whether each page is an image page can be determined by checking a page data list in the structure shown in FIG. 3. When a plurality of pages are designated, the page data link of each page information 409 within the selected range is traced to search the page data list. This determination can be further facilitated when the page control information 410 of the page information 409 contains information representing whether a page is an image page or non-image page.

Figure 14:
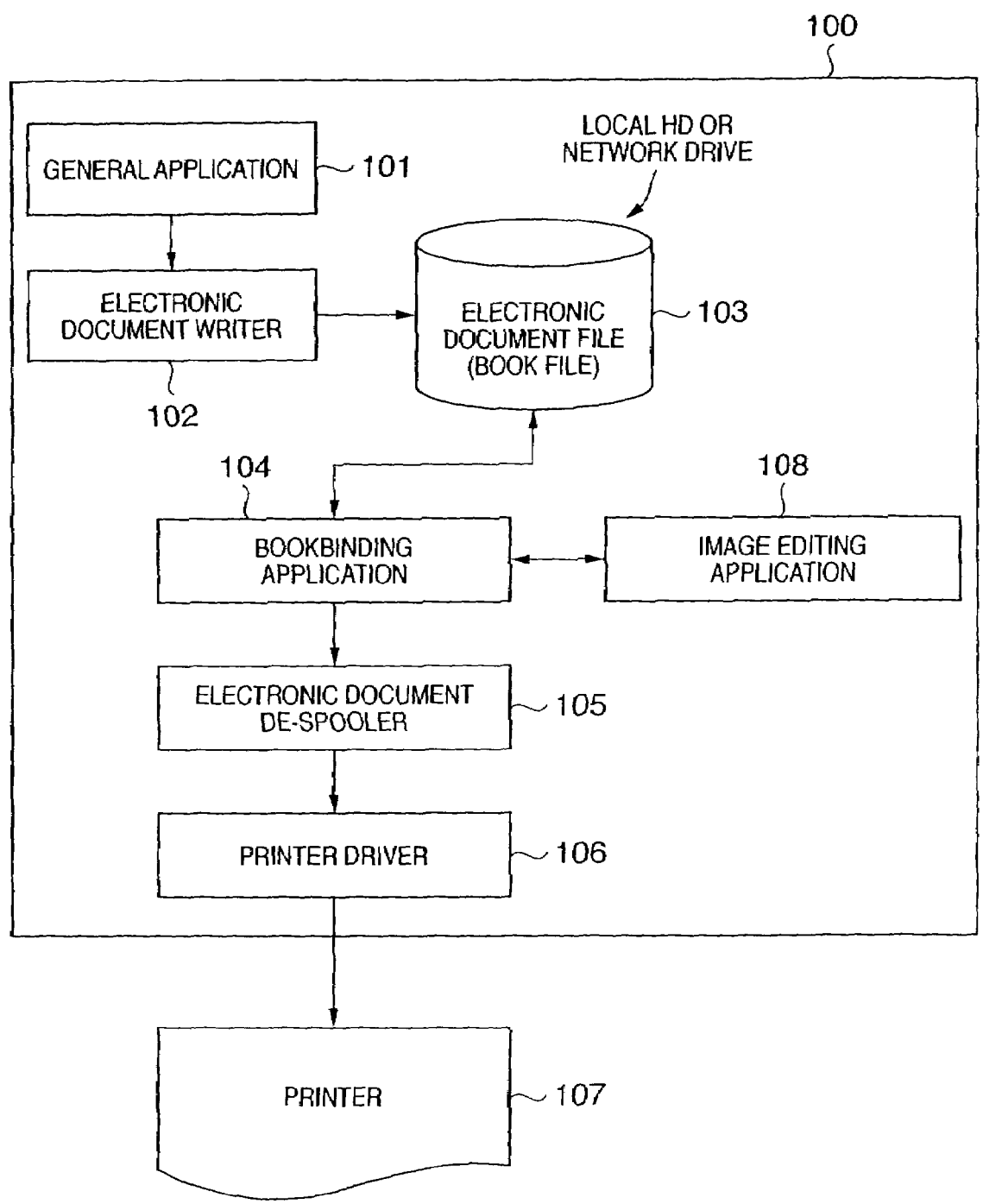
FIG. 14 is a block diagram showing an example of the software configuration of the document processing system in image editing.

FIG. 14 is a block diagram showing the software configuration of the document processing system in image editing. An image editing application 108 in FIG. 14 is one function program contained in the bookbinding application 104, but is illustrated separately from the bookbinding application 104 for convenience.

Figure 15:
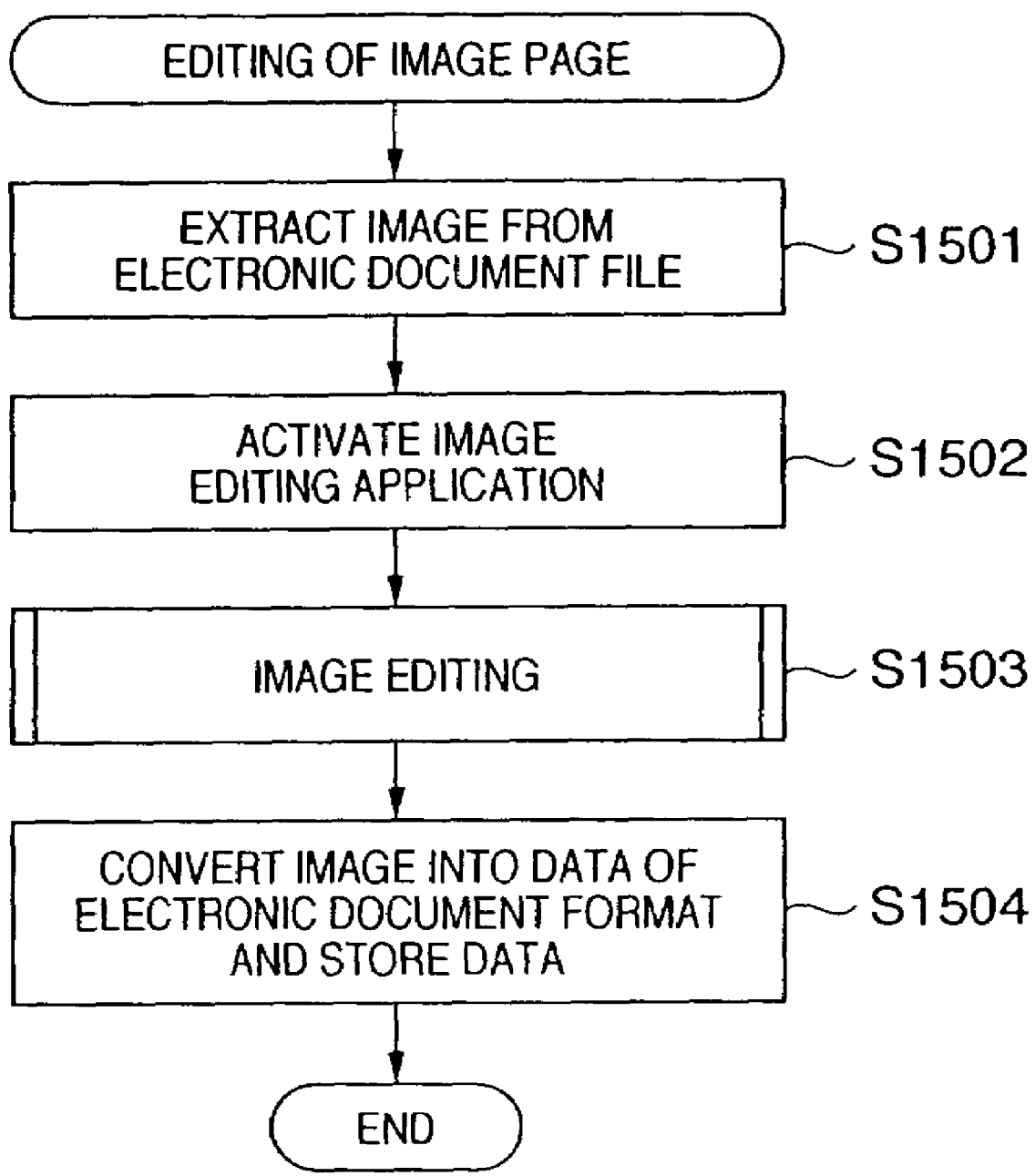
FIG. 15 is a flowchart showing the flow of a series of operations in image editing.

FIG. 15 is a flowchart showing the flow of a series of operations in image editing. The contents of the process will be explained with reference to FIG. 15. An editing process for one image page will be described.

This process starts when the user selects a desired image page at the tree view, displays the pull-down menu of "edit" on the menu bar, and designates image editing while the bookbinding application 104 runs.

The bookbinding application 104 extracts a designated image page from the electronic document file 103 (step S1501), designates the extracted image as an editing target, and activates the image editing application 108 (step S1502). The image editing application 108 edits the image designated in activation (step S1503). After the end of image editing, the bookbinding application 104 stores the edited page image in the electronic document file 103, and ends image editing.

Editing of one image page has been described, and a plurality of image pages can also be edited at once. This process will be explained with reference to the flowchart of FIG. 16.

Figure 16:
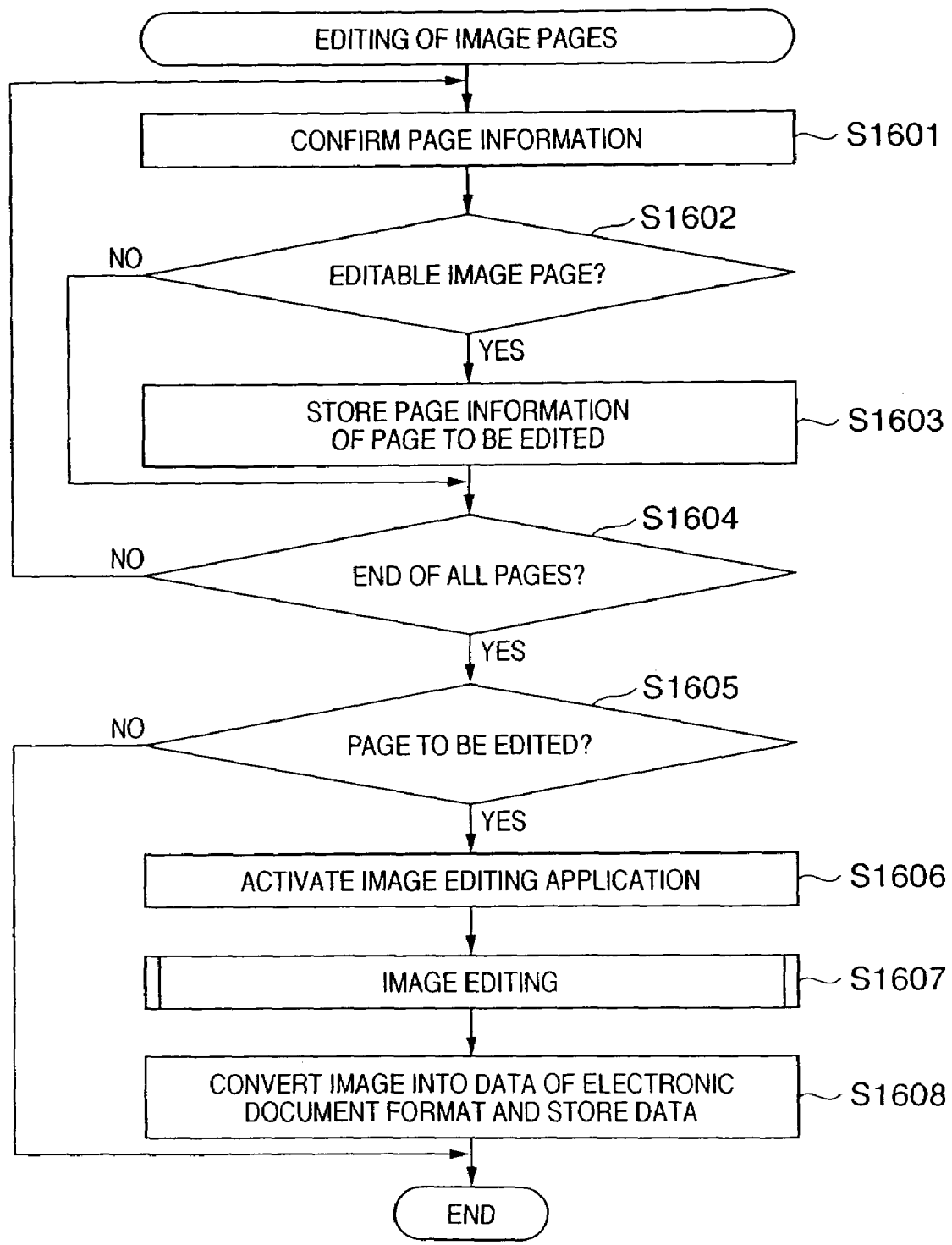
FIG. 16 is a flowchart showing the flow of a series of operations in image editing when a plurality of images can be simultaneously edited.

FIG. 16 shows a process when image editing is designated while the user arbitrarily selects a desired chapter or a plurality of pages at the tree view in the bookbinding application 104. In addition to tree view operation, when a plurality of pages are selected, selection can target pages in a rectangular region specified by designating with a pointing device an upper left corner and then a lower right corner in the preview region 902 where pages are reduced and displayed in the window of FIG. 9. Also, a selected page may be added by clicking each page while pressing the CTRL key of the keyboard. "Select all pages" may also be prepared in the menu bar. In this case, all pages can be selected by one operation.

The bookbinding application 104 gives attention to one page in a selected page group, confirms the page information (step S1601), and determines whether the page is an image page editable by the image editing application 108 (step S1602). This confirmation includes determination of whether the page is an electronic document-imported page or image-imported page, and determination of the image format. Whether the page is an electronic document-imported page or image-imported page can be determined by the following two methods. First, an identifier which explicitly indicates that an image has been imported is held in the page information 409 in importing an image, and the identifier is confirmed in determination. The second method is executed when a page cannot be confirmed as an image by the identifier in the first method. According to the second method, it is confirmed by referring to an electronic document file whether an image drawing instruction having the same size as the page size is contained in the page data list 413. In the second method, an image drawing instruction having the same size as the page size need not always be contained in the page data list 413. The second method can be implemented by determining whether an image drawing instruction (instruction representing that an image is pasted) equal to or more than a predetermined ratio (e.g., 90%) of the size is contained.

The bookbinding application 104 temporarily stores the page determined to be an editable image page, as uniquely specifiable page information 409 (step S1603).

Processes in steps S1601 to S1603 are repeated until the bookbinding application 104 determines in step S1604 that all selected pages have been processed.

As a result, editable image page information 409 is stored. In step S1605, the bookbinding application 104 determines whether one or more pieces of editable image page information 409 exist. If no editable image page information 409 exists, no image page exists in the selected range, and the process ends.

If the bookbinding application 104 determines that one or more image pages to be edited exist, the bookbinding application 104 activates the image editing application 108 (step S1606). At this time, the bookbinding application 104 notifies the image editing application 108 of the temporarily stored page information. The image editing application 108 performs image editing for the notified page (step S1607).

In image editing, the bookbinding application 104 can extract all page images from an electronic document file in advance, and transfer them to the image editing application 108. Alternatively, when the image editing application 108 requires a page image, the bookbinding application 104 can extract the page image from an electronic document file on the basis of notified page information, and transfer the page image to the image editing application 108.

After the end of image editing, the bookbinding application 104 stores the page image again in the electronic document data (step S1608), and image editing as a series of processes ends.

The above image editing will be explained more easily with reference to FIGS. 17 and 18.

Figure 17:
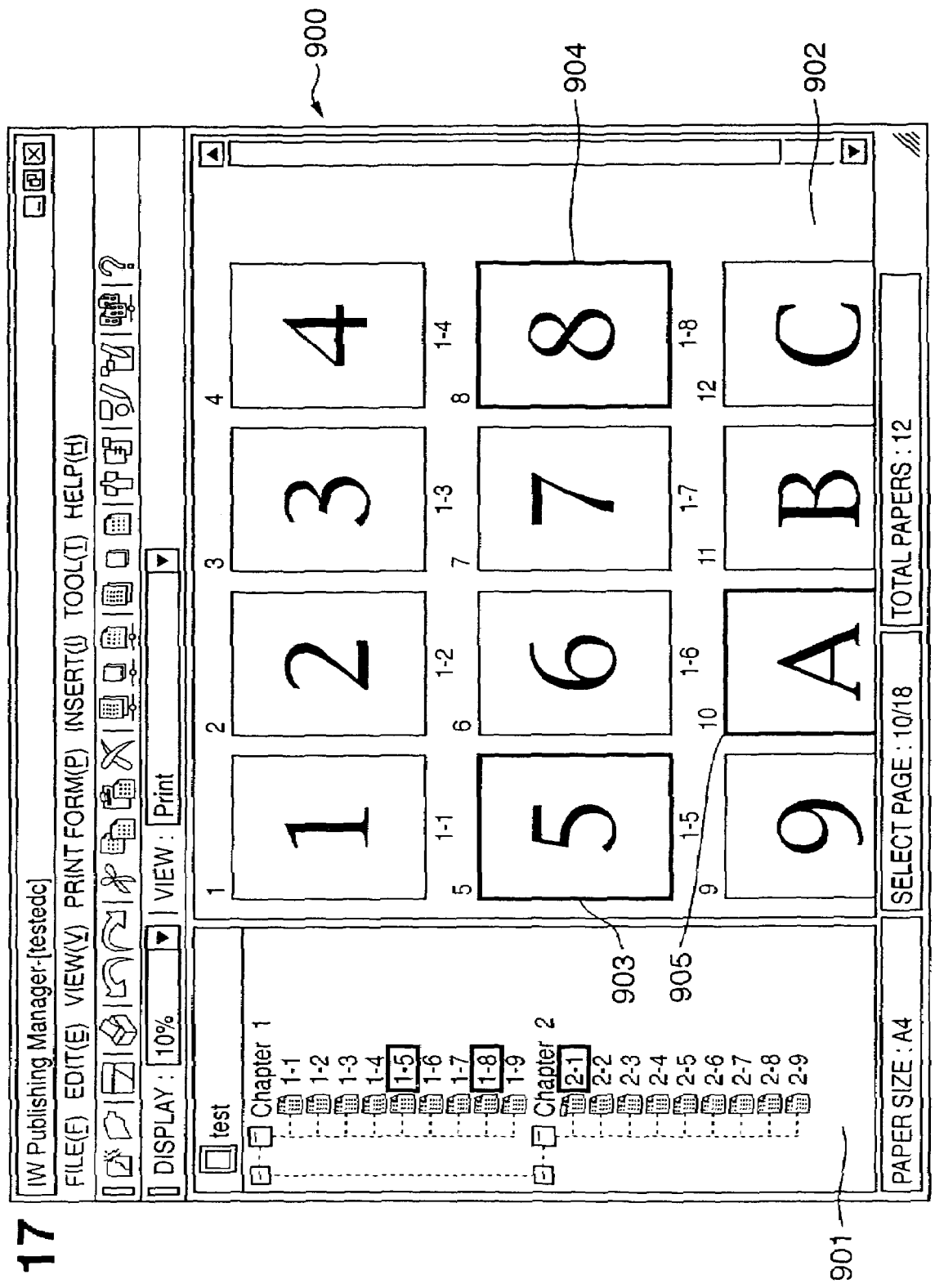
FIG. 17 is a view showing an example of page selection with the UI of a bookbinding application.

FIG. 17 shows an example of page selection with the UI of the bookbinding application 104. In FIG. 17, the fifth page (903), eighth page (904), and 10th page (905) are selected. The first to ninth pages are pages created by image import, and the 10th and subsequent pages are pages created by electronic document import. Of the selected fifth, eighth, and 10th pages, the fifth and eighth pages are image pages, and the 10th page is a non-image page. When image editing is designated in this state, the image editing application 108 is notified of only page information of the fifth and eighth pages. FIG. 18 shows an example of UI display in the image editing application 108 in this case.

Figure 18:
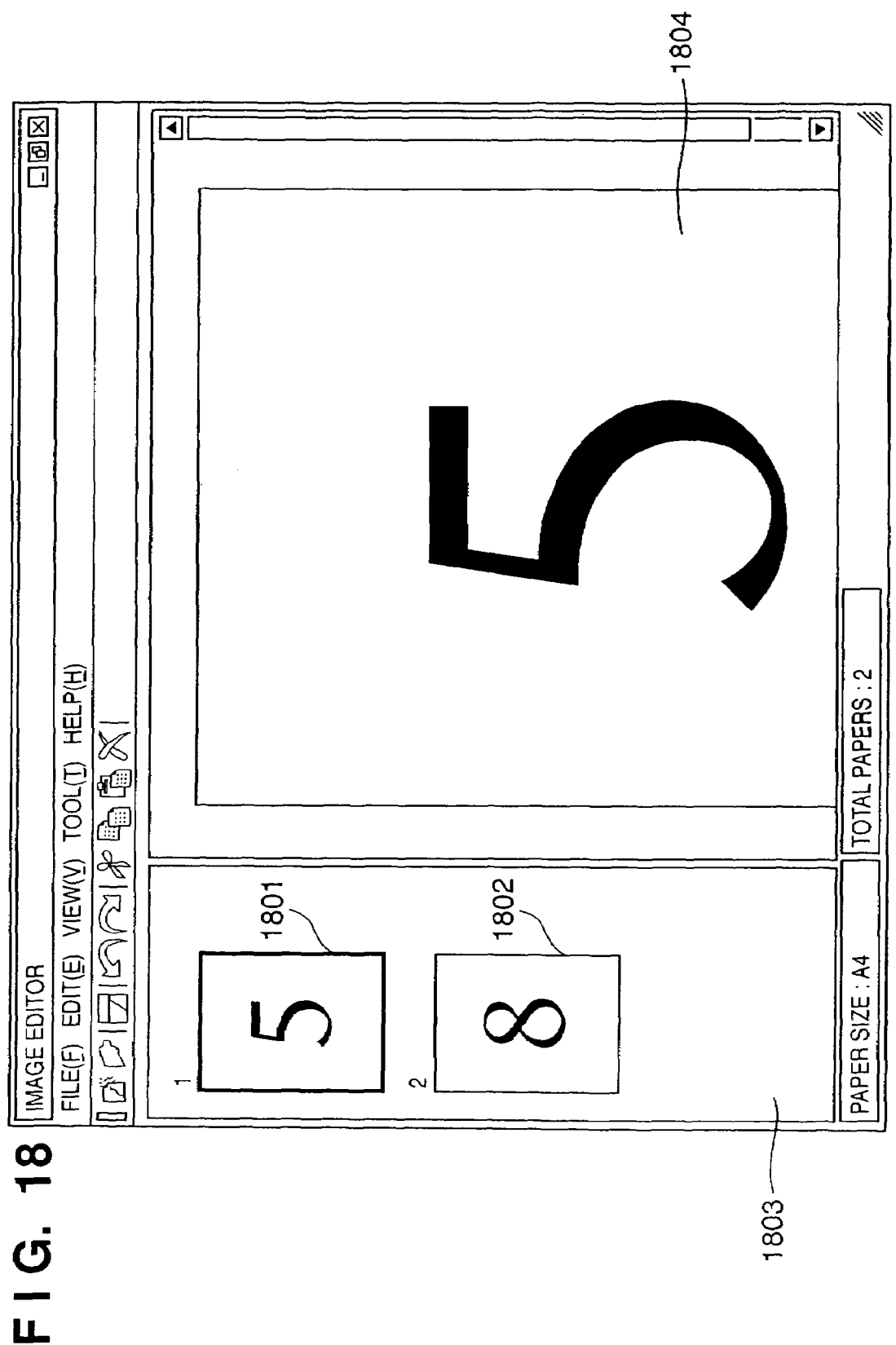
FIG. 18 is a view showing an example of UI display by an image editing application.

As shown in FIG. 18, the image editing application 108 is made up of a region 1803 where a list of pages to be edited is displayed, and a region 1804 where the contents of a page during editing are displayed. Upon activation, the UI is displayed for the start page as an editing target among pages to be edited. The frame of the fifth page is made bold to represent that the fifth page is an editing target. A page to be edited is switched by clicking a desired page in the region 1803. The frame of a page to be edited becomes bold, and the contents of the page are displayed in the editing region 1804.

Image editing includes range designation, erase, paint, line drawing, insertion of a character image, trimming, rotation, and removal of an isolated black dot. These editing processes are well-known, and a description thereof will be omitted. For a page input by image import, when the image is scanned by a scanner or the like, it may be skewed and scanned owing to document conveyance, or a black point may appear owing to dust. In this case, the same problem may arise in a plurality of pages, and whether to perform skew correction or black point removal for a currently selected page or all pages input as image editing targets at once can be selected. Whether a document has been skewed and scanned is determined by detecting the edge of a document and calculating the inclination of a straight line represented by the document edge. When the inclination shifts by a predetermined angle or more, a rotation process is executed to make the edge line coincide with the nearest horizontal or vertical line. A black point is removed by, when the number of black pixels is equal to or smaller than a predetermined number, black pixels are concentrated in a predetermined area, and no other black pixel exists in a predetermined range, determining a black pixel as noise and replacing it with a white pixel.

Figure 19:
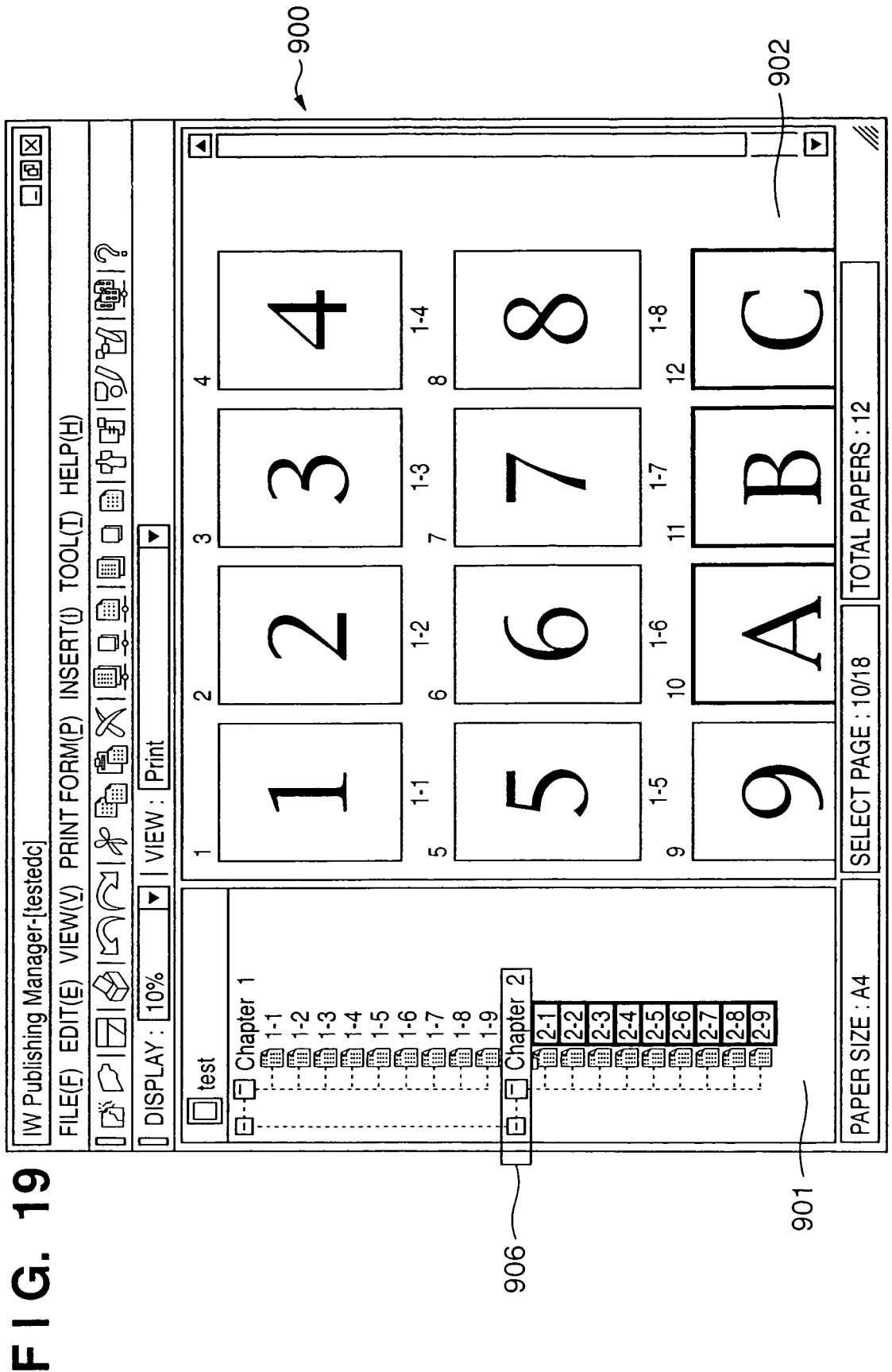
FIG. 19 is a view showing an example of page selection with the UI of the bookbinding application when a chapter is selected.
Figure 20:
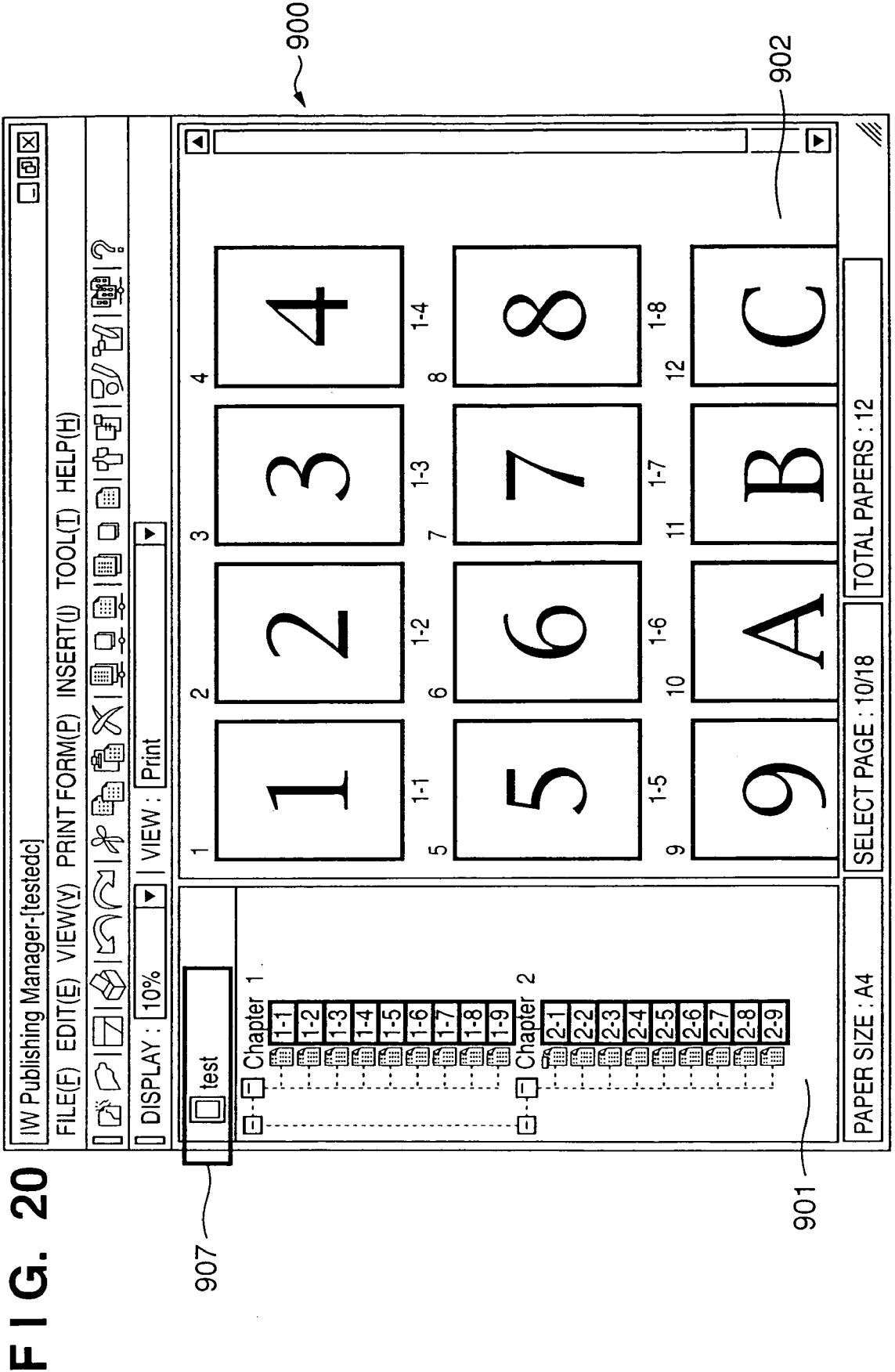
FIG. 20 is a view showing an example of page selection with the UI of the bookbinding application when a book is selected.

In the above example, a page is selected in the preview region 902. When, e.g., "chapter" is selected at the tree portion 901, as shown in FIG. 19, all pages contained in the chapter can also be determined as provisionally selected pages. If a book is selected (a heading 907 of the book is selected), as shown in FIG. 20, all pages contained in the book can also be selected. Pages can also be selected by a combination of these methods.

As described above, according to the first embodiment, an image file interpretable by the bookbinding application 104 is directly imported, and for an uninterpretable application data file, a result of converting the application data file into an electronic document file by the electronic document writer 102 is imported. A bookbinding data file containing image pages and non-image pages can be created regardless of the type and manufacturer of an application program which creates pages, and image editing can be executed for only image pages without any consciousness.

Second Embodiment

In the above embodiment (first embodiment), whether image editing is possible is checked only after the user selects a plurality of pages and designates image editing while selecting the pages. In the second embodiment, whether image editing is possible is checked when a book file is opened. A description of the same part as that of the first embodiment will be omitted.

Figure 21:
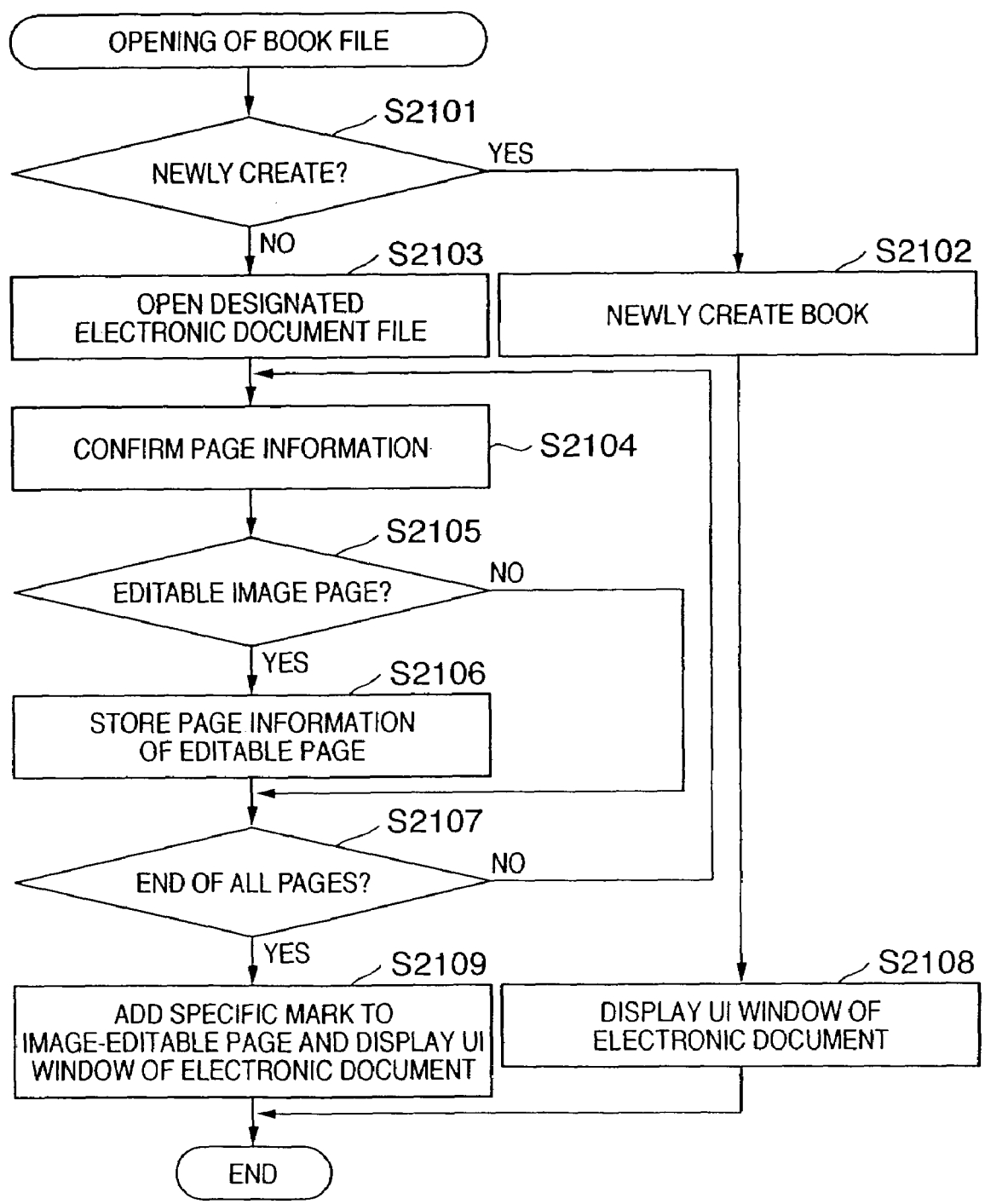
FIG. 21 is a flowchart showing a sequence of opening a book file by a bookbinding application according to the second embodiment.

FIG. 21 is a flowchart showing a sequence of opening a book file by a bookbinding application 104 according to the second embodiment.

The bookbinding application 104 determines whether a book file to be opened is a file to be newly created or an existing file (step S2101). If a file is to be newly created, a book file containing no chapter is newly created (step S2102). A UI (User Interface) window for editing the new book file is displayed (step S2108).

If the book file is an existing book file, the bookbinding application 104 opens the designated book file (step S2103), sequentially confirms pieces of page information of all pages (step S2104), and determines for each page whether the page can undergo image editing by an image editing application 108 (step S2105). This determination includes confirmation of whether the page is an electronic document-imported page or image-imported page, and confirmation of the image format. Whether the page is an electronic document-imported page or image-imported page can also be determined by referring to an electronic document file and confirming whether a page data list 413 contains an image drawing instruction having the same size as the page size. Alternatively, an identifier which explicitly indicates that an image has been imported is held in page information 409 in importing an image, and the identifier is confirmed in determination.

For the page determined to be an editable image page, the bookbinding application 104 temporarily stores the page information 409 which can uniquely specify the page (step S2106).

The above process is repeated until all pages are determined in step S2107 to have been processed.

If the bookbinding application 104 determines that all pages have been determined, the process advances to step S2109 to refer to the temporarily stored page information, add an image-editable mark to the page, and display a UI (User Interface) window (FIG. 22) (step S2109). An image-uneditable page is displayed in a general way.

Figure 22:
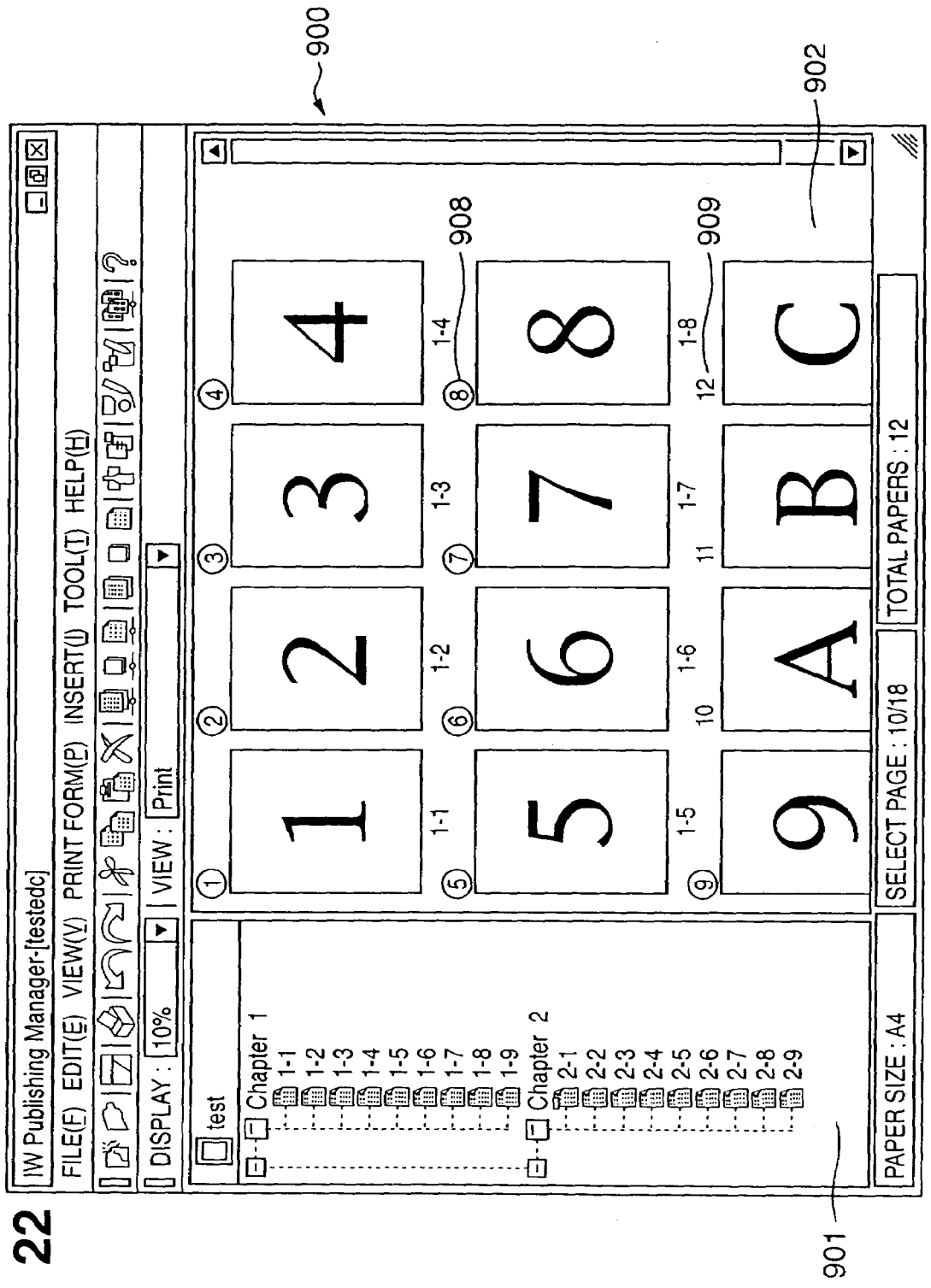
FIG. 22 is a view showing the UI window of the bookbinding application in which a mark is added to a page determined to be an editable image page according to the second embodiment.

In FIG. 22, a page with a page number circled with a ○ mark 908 is an image-editable page. Note that FIG. 22 illustrates merely an example, and any form can be adopted as far as image editing "possible/impossible" can be discriminated. For example, whether image editing is possible or impossible can be discriminated by the color of the frame of each page.

Figure 23:
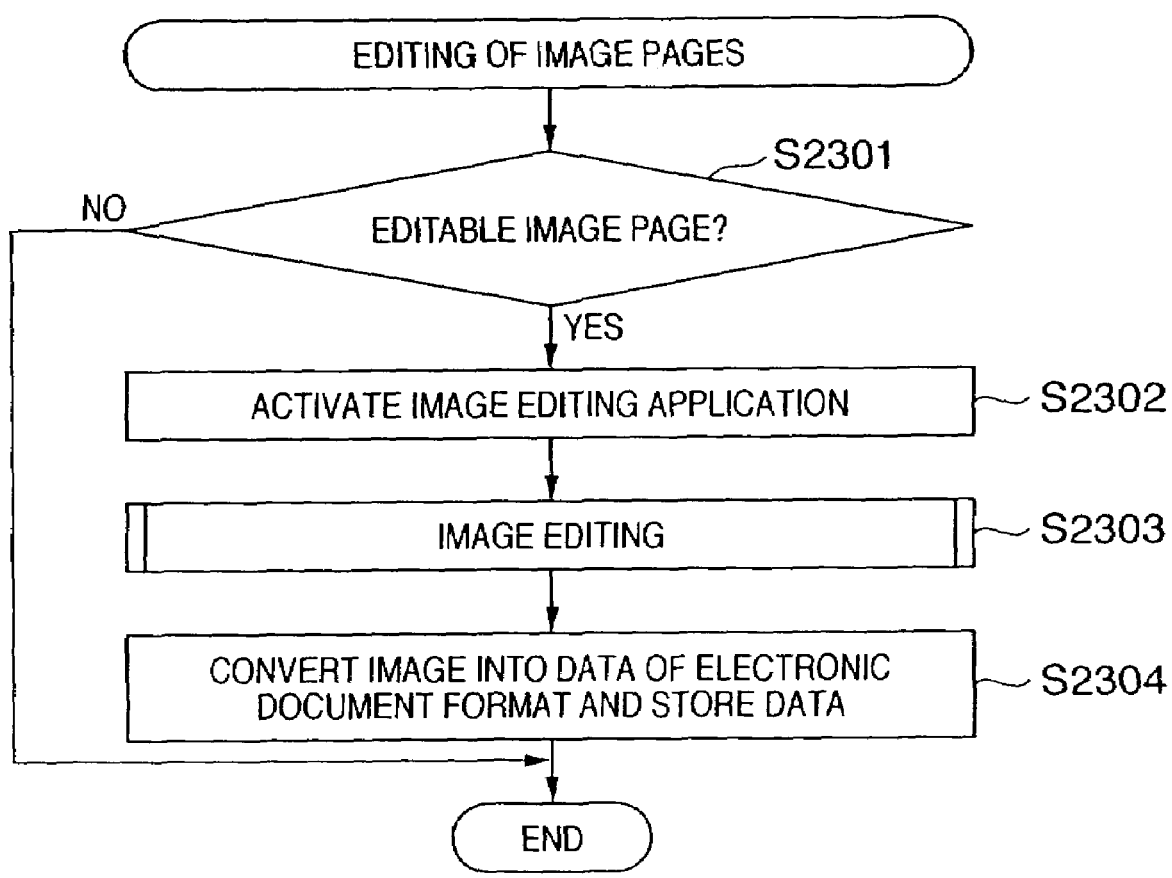
FIG. 23 is a flowchart showing the flow of a series of operations in image editing according to the second embodiment.

FIG. 23 is a flowchart showing the flow of a series of operations in image editing when the image editing application 108 can simultaneously edit a plurality of images. When the user designates image editing while selecting a plurality of pages, the bookbinding application 104 omits the sequence (described in the first embodiment) of sequentially confirming pieces of page information for the selected pages and determining whether each page can undergo image editing by the image editing application 108. The bookbinding application 104 confirms whether a page to be edited exists for only pages to be edited whose page information is stored (step S2301), and activates the image editing application (step S2303).

According to the above sequence, the user can be explicitly presented in advance with image-editable pages in an electronic document file containing both image data pages and electronic data pages. The user can more conveniently select a page, a chapter, a book, or a combination of them without any consciousness of the type of document.

In the flowcharts described in the first and second embodiments, preceding and succeeding steps can be exchanged unless the process becomes uncompleted.

As has been described above, according to the present invention, bookbinding data containing pages created by respective applications can be constructed regardless of the type of application. When one or more desired pages contained in bookbinding data are selected, image editing is designated, but a non-image page exists in the selected pages, the non-image page can be excluded from editing targets, and the process can shift to image editing. As a result, the user can be provided with a good operation environment.

Most features of the embodiments are implemented by a computer program, as shown in FIG. 1, and the program falls within the spirit and scope of the present invention. In general, the computer program can be executed by setting in a computer a computer-readable storage medium such as a CD-ROM which stores the computer program, and copying or installing the computer program in the system. Such computer-readable storage medium also falls within the spirit and scope of the present invention.

As many apparently widely different embodiments of the present invention can be made without departing from the spirit and scope thereof, it is to be understood that the invention is not limited to the specific embodiments thereof except as defined in the claims.

CLAIM OF PRIORITY

This application claims priority from Japanese Patent Application No. 2004-121870 filed on Apr. 16, 2004, which is hereby incorporated by reference herein.

What is claimed is:

1. A document processing apparatus which edits an electronic document file containing both an image page and a non-image page, comprising:
   an editing unit adapted to edit an image page included in an electronic document file;
   an identifying unit adapted to identify a plurality of image pages from the electronic document file as editing targets of said editing unit;
   a display unit adapted to display the plurality of image pages, whereby the image pages are distinguished from the non-image pages in accordance with the identifying resulting by said identifying unit, and
   an applying unit adapted to apply the edit made to the image page included in the electronic document file to the plurality of image pages identified by said identifying unit and displayed by said display unit, and not the non-image pages, when editing processing is performed by said editing unit.

2. The apparatus according to claim 1,
   wherein the electronic document file has a hierarchical structure formed from a book representing a property of an entire electronic document file, at least one chapter contained in the book, and at least a page contained in each chapter, and
   wherein said display unit displays the image pages contained in a first chapter and does not display image pages contained in a second chapter when the first chapter is selected.

3. The apparatus according to claim 1, wherein said editing unit can switch between whether to execute editing for a group of pages selected from image pages, and whether to execute editing for all the image pages at once.

4. The apparatus according to claim 1, wherein said editing unit executes skew correction and black point removal of the image page.

5. A method of controlling a document processing apparatus which edits an electronic document file containing both an image page and a non-image page, comprising:
   an editing step of editing an image page included in an electronic document file;
   an identifying step of identifying a plurality of image pages from the electronic document file as editing targets in said editing step;
   a display step of displaying the plurality of image pages, whereby the image pages are distinguished from non-image pages in accordance with the identifying resulting in said identifying step; and
   an applying step of applying the editing of the image page included in the electronic document file to the plurality of image pages identified in said identifying step and displayed in said display step, and not the non-image pages, when editing is performed in said editing step.

6. The method according to claim 5,
   wherein the electronic document file has a hierarchical structure formed from a book representing a property of an entire electronic document file, at least one chapter contained in the book, and at least a page contained in each chapter, and
   wherein said display step displays the image pages contained in a first chapter and does not display image pages contained in a second chapter when the first chapter is selected.

7. The method according to claim 5, wherein, in the editing step, whether to execute editing for a group of pages selected from image pages, and whether to execute editing for all the image pages at once can be switched.

8. The method according to claim 5, wherein said editing step executes skew correction and black point removal of the image page.

9. A computer program stored on a computer readable storage medium, the computer program functioning as a document processing apparatus which edits an electronic document file containing both an image page and a non-image page, wherein the computer program functions as:
   an editing step of editing an image page included in an electronic document file;
   an identifying step of identifying a plurality of image pages from the electronic document file as editing targets in said editing step;
   a display step of displaying the plurality of image pages, whereby the image pages are distinguished from non-image pages in accordance with the identifying resulting in said identifying step; and an applying step of applying the editing of the image page included in the electronic document file to the plurality of image pages identified in said identifying step and displayed in said display step, and not the non-image pages, when editing is performed in said editing step.

10. The program according to claim 9, wherein the electronic document file has a hierarchical structure formed from a book representing a property of an entire electronic document file, at least one chapter contained in the book, and at least a page contained in each chapter, and wherein said display step displays the image pages contained in a first chapter and does not display image pages contained in a second chapter when the first chapter is selected.

11. The program according to claim 9, wherein, in the editing step, whether to execute editing for a group of pages selected from image pages, and whether to execute editing for all the image pages at once can be switched.

12. The program according to claim 9, wherein said editing step executes skew correction and black point removal of the image page.

* * * * *